US012466683B2

(12) United States Patent
Kobayashi et al.

(10) Patent No.: US 12,466,683 B2
(45) Date of Patent: Nov. 11, 2025

(54) PRINTING MEDIUM ACCOMMODATING APPARATUS AND PRINTING APPARATUS

(71) Applicant: CANON KABUSHIKI KAISHA, Tokyo (JP)

(72) Inventors: Ryo Kobayashi, Kanagawa (JP); Tsutomu Obata, Tokyo (JP); Itaru Wada, Kanagawa (JP); Ryo Harigae, Tokyo (JP); Kengo Nieda, Kanagawa (JP); Kohei Fukui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 18/106,647

(22) Filed: Feb. 7, 2023

(65) Prior Publication Data

US 2023/0249935 A1 Aug. 10, 2023

(30) Foreign Application Priority Data

Feb. 8, 2022 (JP) ................................ 2022-017855

(51) Int. Cl.

| | |
|---|---|
| ***B65H 31/20*** | (2006.01) |
| ***B65H 31/02*** | (2006.01) |
| ***B65H 31/22*** | (2006.01) |
| *B41J 3/407* | (2006.01) |

(52) U.S. Cl.

CPC ............ *B65H 31/20* (2013.01); *B65H 31/02* (2013.01); *B65H 31/22* (2013.01); *B41J 3/4078* (2013.01); *B65H 2401/14* (2013.01); *B65H 2402/60* (2013.01); *B65H 2701/11312* (2013.01); *B65H 2801/06* (2013.01); *B65H 2801/15* (2013.01); *B65H 2801/36* (2013.01)

(58) Field of Classification Search

CPC ........ B65H 31/20; B65H 31/02; B65H 31/22; B65H 2701/11312

See application file for complete search history.

(56) References Cited

U.S. PATENT DOCUMENTS

| | | | | |
|---|---|---|---|---|
| 7,997,578 | B2 * | 8/2011 | Saito ...................... | B65H 31/22 271/213 |
| 8,677,567 | B2 | 3/2014 | Kobayashi et al. | |
| 9,592,683 | B2 | 3/2017 | Kobayashi et al. | |
| 9,969,192 | B2 | 5/2018 | Suzuki et al. | |

(Continued)

FOREIGN PATENT DOCUMENTS

| | | | |
|---|---|---|---|
| JP | 7-11831 | A | 1/1995 |
| JP | 2001-002307 | A | 1/2001 |

(Continued)

OTHER PUBLICATIONS

Office Action dated Sep. 24, 2025, in Japanese Patent Application No. 2022-017855.

*Primary Examiner* — Jeremy R Severson
(74) *Attorney, Agent, or Firm* — Venable LLP

(57) ABSTRACT

A printing medium accommodating apparatus can stack a printing medium discharged from a discharge port of a printing apparatus. This accommodating apparatus includes a receiving member configured to receive a printing medium discharged from the discharge port; a holding member configured to hold one end of the receiving member; and a turning member configured to turn the holding member, and includes an attachment unit capable of attaching the turning member to an insertion slot provided in the printing apparatus.

16 Claims, 25 Drawing Sheets

(56) References Cited

U.S. PATENT DOCUMENTS

| | | | |
|---|---|---|---|
| 10,457,516 | B2 | 10/2019 | Ohashi et al. |
| 10,906,764 | B2 | 2/2021 | Yoneyama et al. |
| 11,130,648 | B2 | 9/2021 | Asai et al. |

FOREIGN PATENT DOCUMENTS

| | | | |
|---|---|---|---|
| JP | 2007-314337 | A | 12/2007 |
| JP | 2010-276138 | A | 12/2010 |
| JP | 2013-1528 | A | 1/2013 |
| JP | 2017-65842 | A | 4/2017 |
| JP | 2017-181598 | A | 10/2017 |
| WO | 2021/091568 | A1 | 5/2021 |

* cited by examiner

PRINTING MEDIUM ACCOMMODATING APPARATUS AND PRINTING APPARATUS

BACKGROUND OF THE INVENTION

Field of the Invention

The present disclosure relates to a printing medium accommodating apparatus and a printing apparatus.

Description of the Related Art

A printing medium accommodating apparatus in which to stack a printing medium discharged from a discharge port is known. In a case of using a rolled printing medium, it is difficult to discharge the printing medium to a straight discharge tray. For this reason, for example, a configuration in which a printing medium is received by using a sheet member made of a cloth or the like is known (Japanese Patent Laid-Open No. 2001-002307 (hereinafter, referred to as Document 1)).

Document 1 discloses a configuration in which the printing medium accommodating apparatus includes front rods extending obliquely forward from below a printing apparatus supported on a stand and rear rods extending obliquely rearward therefrom, a sheet member is held by the front and rear rods, and the sheet member takes on a U shape. A printing medium discharged is discharged along the sheet member having the U shape.

The printing medium accommodating apparatus described in Document 1 is configured on the premise that there is a stand which supports the printing apparatus. For this reason, the setting position is limited to positions where the stand can be placed.

SUMMARY OF THE INVENTION

A printing medium accommodating apparatus according to one aspect of the present disclosure is a printing medium accommodating apparatus in which to stack a printing medium discharged from a discharge port of a printing apparatus, including: a receiving member configured to receive a printing medium discharged from the discharge port; a holding member configured to hold one end of the receiving member; and a first attachment unit including a turning member configured to turn the holding member, the turning member being capable of being attached to an insertion slot provided in the printing apparatus.

Further features of the present invention will become apparent from the following description of exemplary embodiments with reference to the attached drawings.

DESCRIPTION OF THE EMBODIMENTS

Hereinafter, preferred embodiments of the present disclosure are described in detail with reference to the attached drawings. Note that the following embodiments are not intended to limit the matters of the present disclosure, and it is not necessarily that all of the combinations of features described in the following embodiments are essential for the solution of the present disclosure. Note that the same constituent elements are denoted by the same reference signs.

First Embodiment

In the present embodiment, a printing medium accommodating apparatus which can be attached to a large-format printing apparatus which is placed on a desktop is described. If a printing medium is discharged from a large-format printing apparatus placed on a desktop without a printing medium accommodating apparatus, the printing medium is discharged on the desktop as it was. In this case, since the printing medium discharged on the desktop stays there, there is a high possibility that when the printing of the next page is completed, printing media come into contact with each other, so that the surfaces thereof are scratched, or jamming occurs. In addition, it can be considered to place a printing apparatus at an end portion of a desktop so that a printing medium falls by its weight in order that sheets discharged do not stay. However, in this case, although jamming as described above can be avoided, there is also a high possibility that the surface of the printing medium is scratched as well due to the fall. For this reason, it is necessary for the user to carefully receive printing media one by one during the discharge, which is inconvenient.

In view of this, in the present embodiment, a mode for using a printing medium accommodating apparatus which can be attached to a printing apparatus placed on a desktop is described.

<Entire Configuration>

Figure 1:
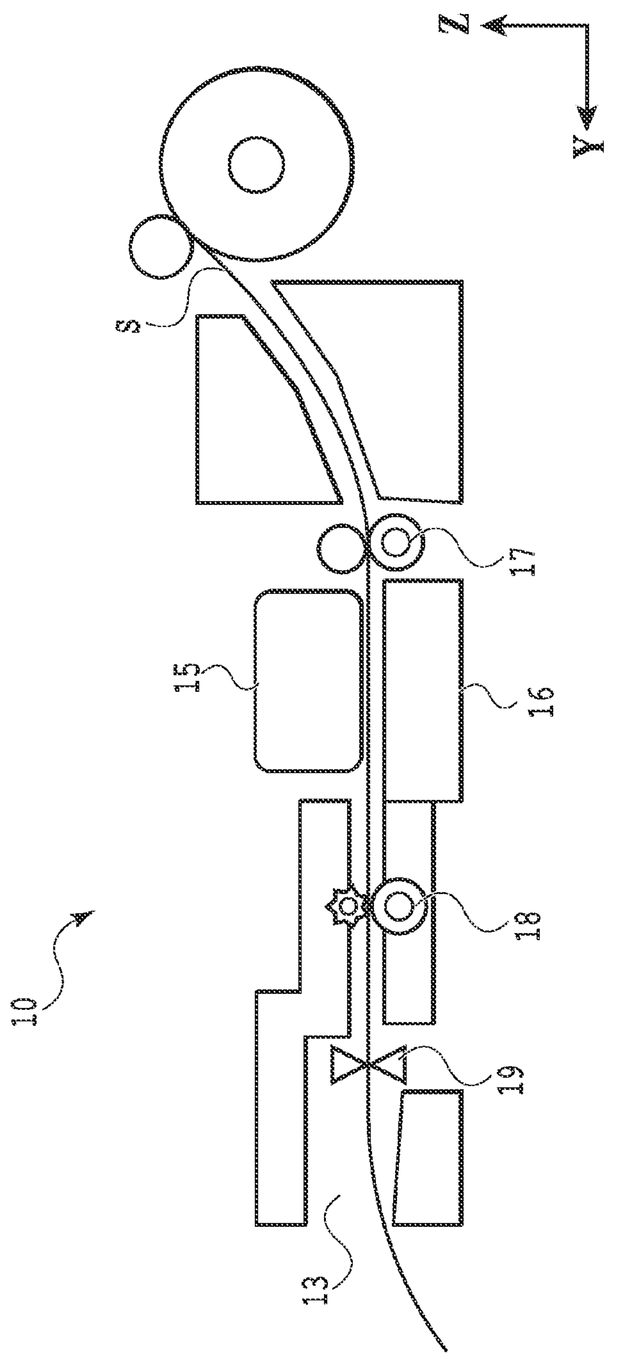
FIG. 1 is a diagram for schematically explaining an example of an entire configuration of a printer.

FIG. 1 is a diagram for schematically explaining an example of an entire configuration of a printer 10, which is a printing apparatus of the present embodiment. A printing medium S wound in a roll passes through a sheet feeding port, and is conveyed by a conveyance roller 17 to a printing area where printing is performed by a printing head 15. A back surface of the printing medium S on the printing area is supported by a platen 16. Hereinafter, the direction in which the printing medium is conveyed is referred to as a +Y direction. In addition, the direction of gravity is referred to as a −Z direction, and the direction (sheet-width direction) in which a printing medium is cut by a cutter, which is described later, is referred to as +X direction (see FIG. 2). In the printing head 15, a plurality of ejecting ports configured to eject ink are formed. The ink is ejected by the printing head 15 onto the conveyed printing medium S, so that an image is formed thereon. The printing medium on which the image has been printed is conveyed further downstream by a discharge roller 18 provided downstream of the printing head 15. Once the printing operation is completed, the printing medium S is conveyed such that the sheet-cutting position coincides with the position of the cutter 19 by the conveyance roller 17 and the discharge roller 18. Thereafter, the cutter 19 moves in the sheet-width direction (+X direction) to cut the printing medium S on which the image has been printed, and the printing medium S thus cut is discharged through the discharge port 13 to the outside of the apparatus.

Figure 2:
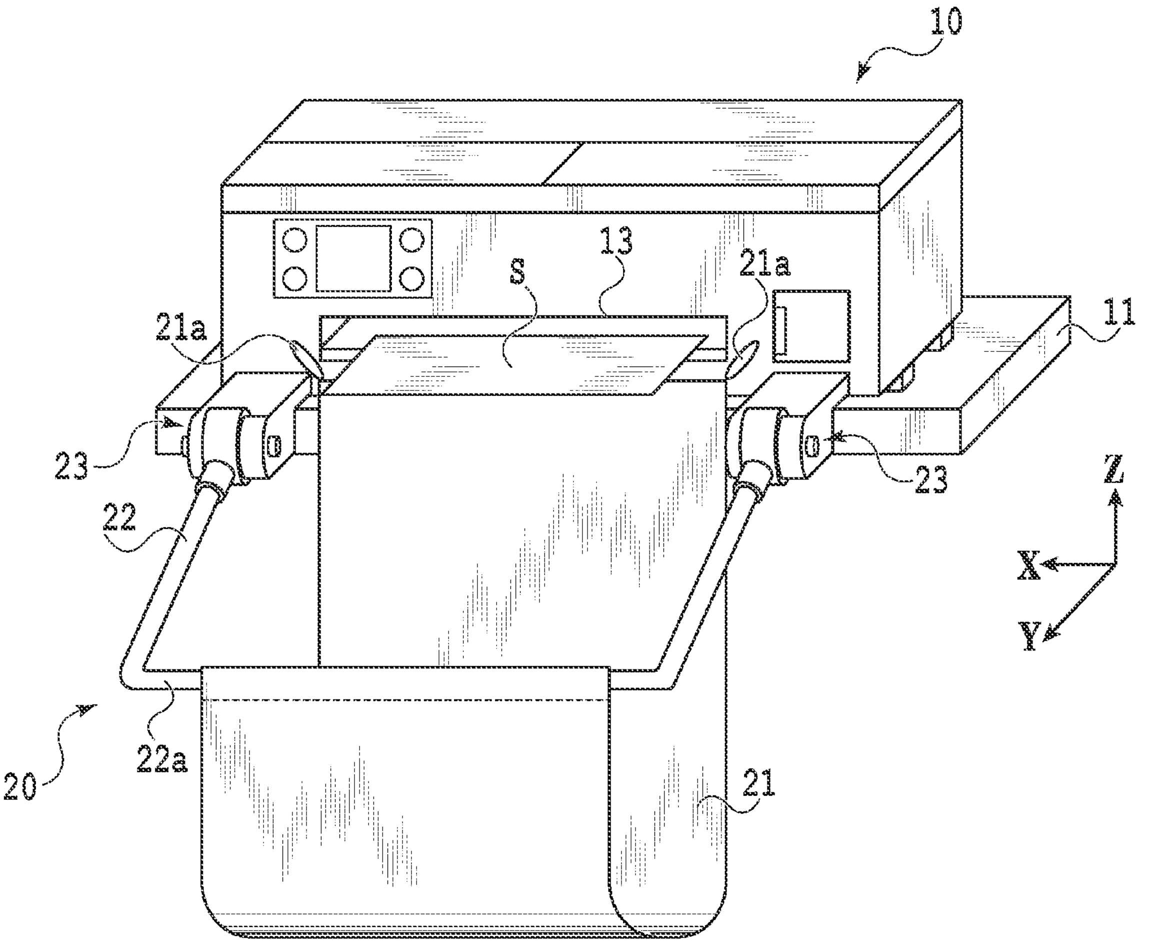
FIG. 2 is a diagram schematically showing a printing medium accommodating apparatus and the printer.

FIG. 2 is a diagram schematically showing a printing medium accommodating apparatus 20 of the present embodiment and the printer 10, which is a printing apparatus. FIG. 2 shows a schematic perspective view of a state where the printing medium accommodating apparatus 20 is mounted on the printer 10. The embodiment is further described with reference to FIG. 1 and FIG. 2.

The printer 10 is a desktop-type printer placed on the ground face or surface of a desk 11. In other words, the printer 10 is a printer that does not have stands (legs) having such a length that allows an accommodating cloth 21, which is a receiving member described later, to be included below the printer. The printer 10 includes the discharge port 13 from which to discharge the printing medium S on which the image has been formed, and the printing medium S discharged from the discharge port 13 is accommodated in the printing medium accommodating apparatus 20 placed below the discharge port 13 (in the direction of gravity·−Z direction).

The printing medium accommodating apparatus 20 includes the accommodating cloth 21, a rod member 22, and attachment units 23. The printing medium accommodating apparatus 20 is attached to a face of the printer 10 on the side where the discharge port 13 is provided. The downstream end portion (the end portion in the +Y direction) of the accommodating cloth 21 is sewn while being bent to be formed in a bag shape. The rod member 22, which is a holding member, has an angular U shape with two bent portions, and the rod member 22 is passed through the bag shape of the accommodating cloth 21, so that the accommodating cloth 21 and the rod member 22 are integrated. The bag shape of the accommodating cloth 21 is placed on a side (a holding portion 22*a*) between the two bent portions of the rod member 22. In addition, the upstream end portion (the end portion in the −Y direction) of the accommodating cloth 21 is configured to be capable of being mounted on the printer 10.

Since the printing medium accommodating apparatus 20 includes the attachment units 23, it is possible to attach the printing medium accommodating apparatus 20 to the printer 10 by using the attachment units 23 after the printer 10 is placed on any desired ground face. Once the printing medium accommodating apparatus 20 is attached to the printer 10 by using the pair of attachment units 23, the accommodating cloth 21 turns into a sheet member having a substantially U shape as viewed from the side of the printing medium accommodating apparatus 20. The printing medium S discharged from the discharge port 13 of the printer 10 is accommodated in the accommodating cloth 21. This sheet member having the substantially U shape serves as an accommodating portion to accommodate the discharged printing medium S.

<Attachment Units>

Figure 3:
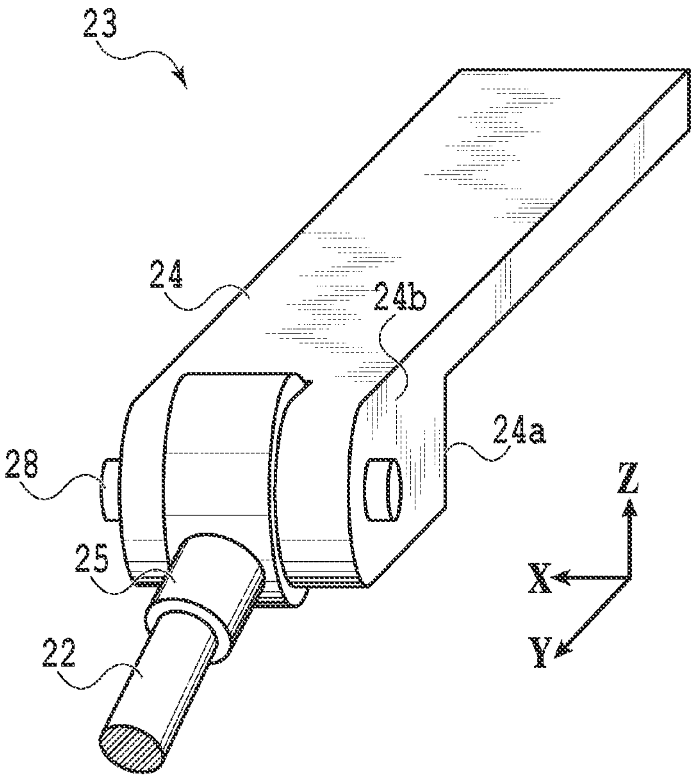
FIG. 3 is a perspective view of an attachment unit.
Figure 4B:
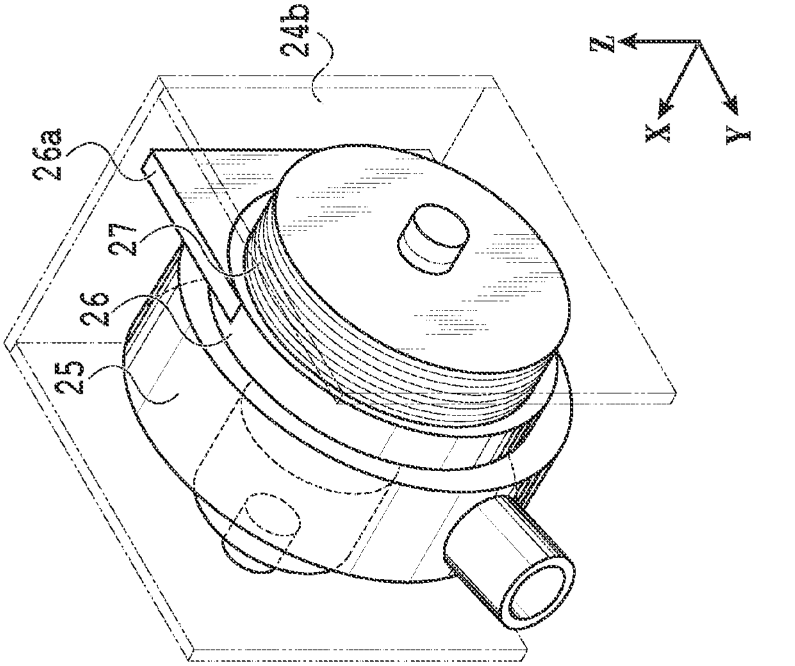
FIGS. 4A and 4B are each a diagram for explaining an internal structure of the attachment unit.
Figure 4A:
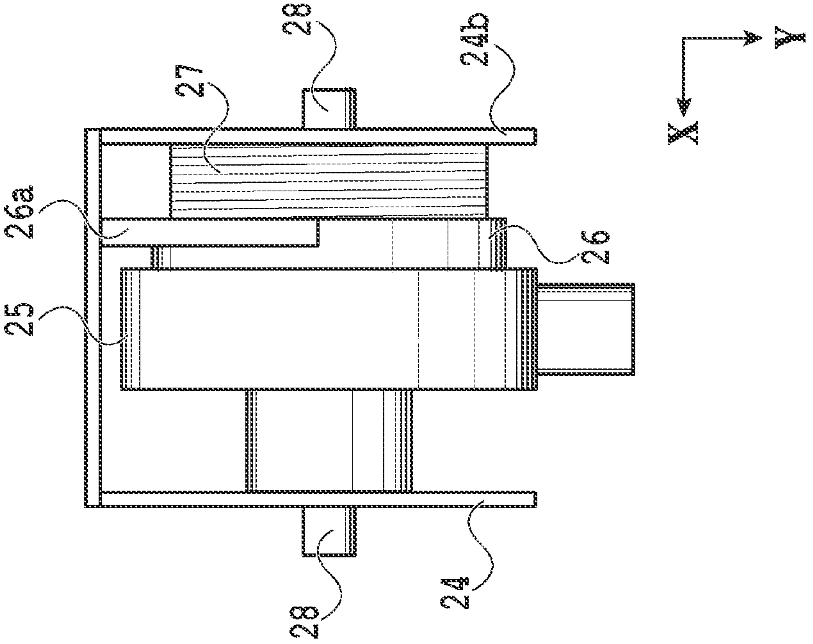

FIG. 3 is a perspective view of the attachment unit 23. FIGS. 4A and 4B are each a diagram for explaining an internal structure of the attachment unit 23. FIG. 4A is a top view showing through an inside of the attachment unit 23, and FIG. 4B is a perspective view showing through the inside of the attachment unit 23. The detailed configuration of the attachment unit 23 is described by using FIG. 3 and FIGS. 4A and 4B. Note that in order to distinguish the attachment unit 23 from the configuration in which the accommodating cloth 21 is attached to the printer 10, which is described later, the attachment unit 23 is also referred to as a first attachment unit.

The attachment unit 23 includes an insertion member 24 having a shape to be inserted into a main body, and a turning member 25 configured to be capable of turning while holding an end portion of the rod member 22. In addition, the attachment unit 23 includes a sliding member 26 (a pressing member) configured to press a side face of the turning member 25, an elastic member 27 (a spring member) configured to press the sliding member 26, and a rotation shaft 28 attached in the center of turning of the turning member 25.

The insertion member 24 has, on the main body side of the printer 10, insertion shapes configured to fit into insertion slots 14 (see FIG. 5) of the printer 10. In addition, a lower portion of the insertion shape is provided with an abutting portion 24*a* configured to abut on the desk 11. In addition, the insertion member 24 includes a holder 24*b* having a hollow inside on the side opposite to the side where the insertion shape is formed, and contains the turning member 25, the sliding member 26, the elastic member 27, and the rotation shaft 28 inside the holder 24*b*. More specifically, the elastic member 27, the turning member 25, and the sliding member 26 in a compressed state are incorporated inside the holder 24*b*. The sliding member 26 is incorporated in the holder 24*b* such that the sliding member 26 is biased against the turning member 25 by the elastic member 27. When the turning member 25 is about to turn, since the turning member 25 is receiving side pressure from the sliding member 26 biased by the elastic member 27, the rod member 22 is held at a free angle by the frictional force. Note that the sliding member 26 includes a restricting face 26*a* configured to restrict the turning so that the sliding member 26 will not turn together with the turning member 25. In the case where the turning member 25 turns as well, since the restricting face 26*a* is in contact with the holder 24*b*, the sliding member 26 does not turn and can hold the posture. Here, the frictional force is a force stronger than a force by which the rod member 22 descends by its own weight. The frictional force can be adjusted by adjusting the pressing force by the elastic member 27 and the coefficient of friction at the sliding face between the sliding member 26 and the turning member 25.

The turning member 25 has a cylindrical shape. The inner diameter of the cylinder of the turning member 25 is larger than the outer diameter of the rod member 22. It is made possible for the turning member 25 and the rod member 22 to turn together by inserting the end portion of the rod member 22 and fixing the end portion with a screw or the like. Note that the fixing method is not limited to the fixation using a screw, and the rod member 22 may be configured to be fixed by press-fitting, a claw shape, or the like.

<Accommodating Cloth>

Figure 5:
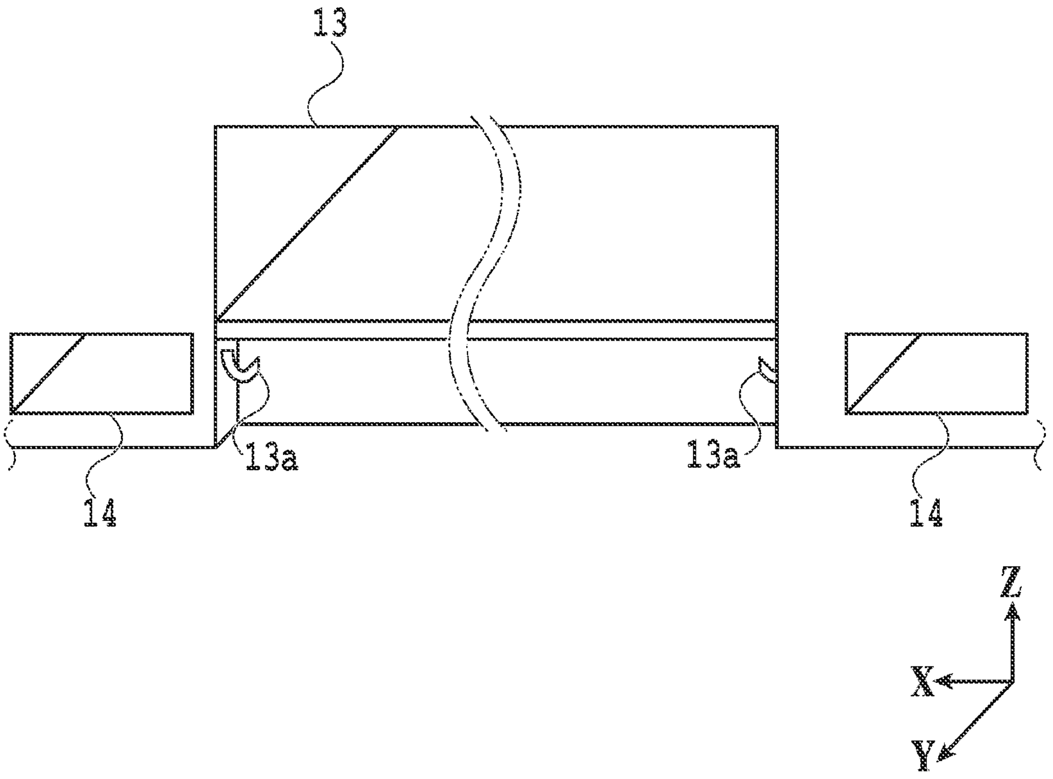
FIG. 5 is a diagram for explaining attachment of an accommodating cloth.
Figure 6:
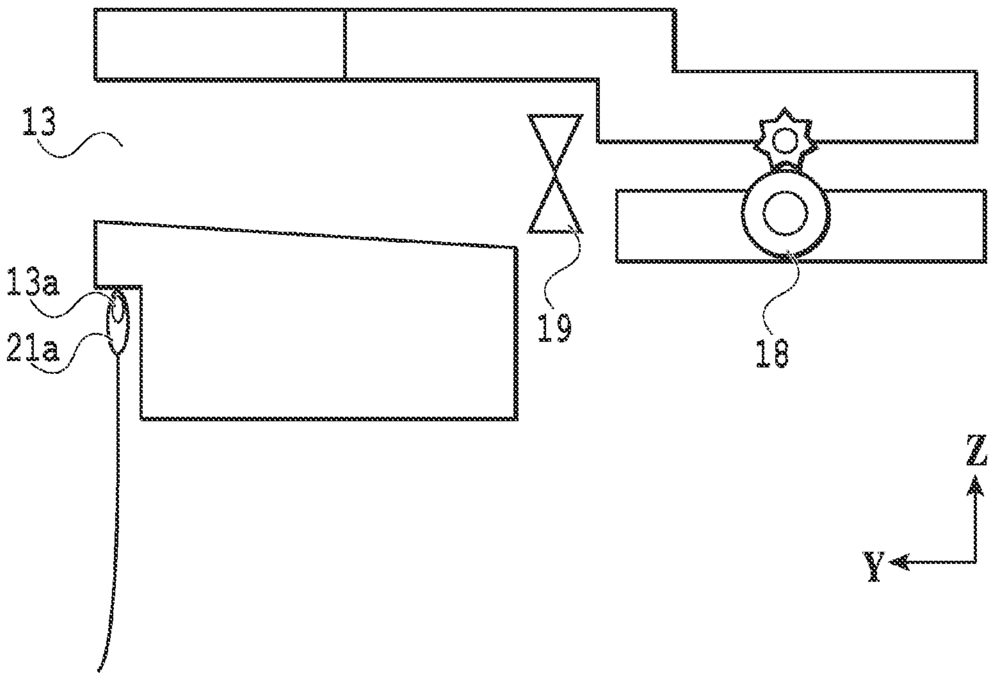
FIG. 6 is a cross-sectional view for explaining the attachment of the accommodating cloth.

FIG. 5 is a diagram for explaining attachment of the accommodating cloth 21, which is the sheet member. FIG. 6 is a cross-sectional view for explaining the attachment of the accommodating cloth 21. The attachment of the accommodating cloth 21 is described with reference to FIG. 5 and FIG. 6.

As described above, the accommodating cloth 21 has the bag shape formed across the entire face in the width direction at one end portion thereof. On the other hand, on the opposite end portion of the accommodating cloth 21, hanging strings 21*a* each having a ring shape are stitched to both end portions in the width direction. In addition, in the main body of the printer 10, hooks 13*a* are arranged at both outer sides of the discharge port 13 in the width direction and below the discharge port 13. The accommodating cloth 21 is configured to be attached to the main body of the printer 10 by hanging the hanging strings 21*a* of the accommodating cloth 21 on the hooks 13*a*, respectively. As shown in FIG. 5 and FIG. 6, the lower portion of the discharge port 13 has a shape depressed on the side opposite to the discharge direction (on the printer main body side), and the hooks 13*a* are provided in the depressed portion. The configuration in which the opposite end of the accommodating cloth 21 opposite to the one end which is held by the rod member 22 can be attached to the printer main body side, like the hanging strings 21*a* is referred to as a second attachment unit.

In a case where the accommodating cloth 21 is attached to the main body of the printer 10, the accommodating cloth 21 hung on the hooks 13*a* is preferably attached such that no gap is formed between the accommodating cloth 21 and the main body of the printer 10. This is because if there is a gap between the printer 10 and the accommodating cloth 21, there is a possibility that the leading end of the discharged printing medium S enters the gap to cause jamming. Hence, as shown in FIG. 5 and FIG. 6, by making a configuration in which a depressed step of several millimeters is provided on the printer 10 side and the accommodating cloth 21 is attached to the step, it is possible to prevent a gap from being generated. Note that in this example shown above, two hooks 13*a* in total are provided on the outer sides of the discharge port 13 in the width direction; however, the configuration is not limited to this. The accommodating cloth 21 only has to be able to be attached as appropriate, and the positions and the number of the hooks 13*a* are not limited to the example shown in the drawings.

<Attachment of Attachment Unit to Printer>

Figure 7:
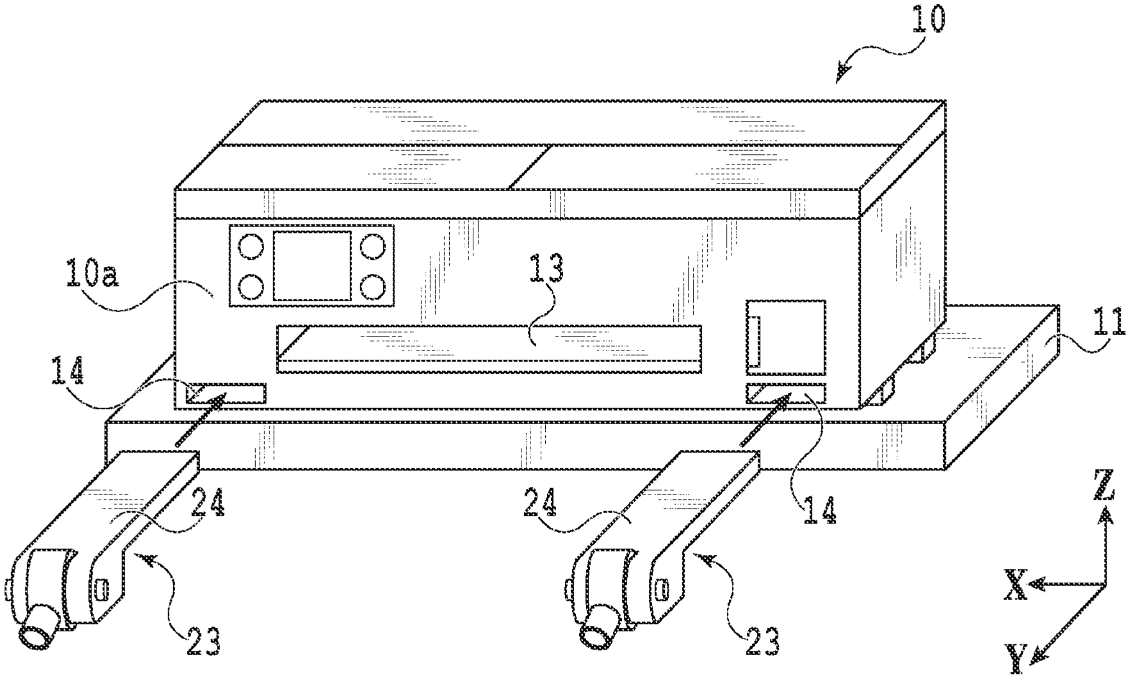
FIG. 7 is a perspective view for explaining an example of attaching the attachment unit to the printer.
Figure 8:
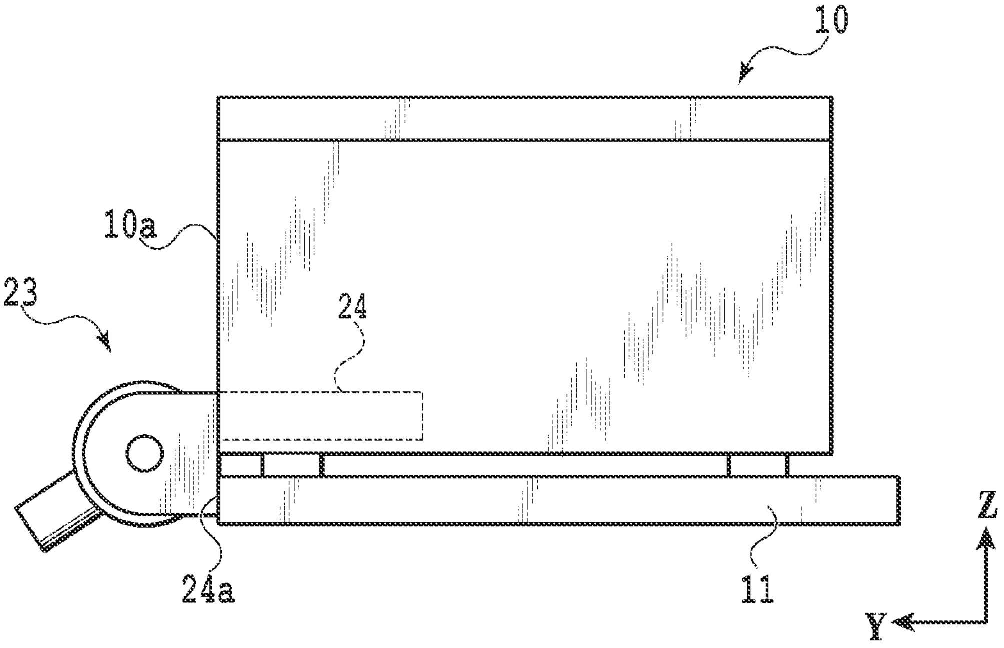
FIG. 8 is a side view for explaining the example of attaching the attachment unit to the printer.

FIG. 7 is a perspective view for explaining an example of attaching the attachment unit 23 to the printer 10. FIG. 8 is a side view for explaining the example of attaching the attachment unit 23 to the printer. The example in which the attachment unit 23 is attached to the printer 10 is described by using FIG. 7 and FIG. 8.

The insertion slots 14 are formed, respectively, on both outer sides in the sheet-width direction of the discharge port 13 of the printer 10. The insertion members 24 of the attachment units 23 are inserted into the insertion slots 14. Note that although FIG. 7 shows an example in which the insertion slots 14 are formed below the discharge port 13, the positions are not limited to this. The attachment units 23 are attached to the insertion slots 14 of the printer 10 placed on the desk 11 provided at a desired position, so that the printing medium accommodating apparatus 20 is attached to the printer 10. The insertion slots 14 and the insertion members 24 are configured to be fitted to each other, and the attachment units 23 are fixed to the printer 10 by inserting the insertion members 24 into the insertion slots 14.

Here, as shown in FIG. 7 and FIG. 8, the printer 10 is preferably placed such that a front-face exterior 10*a* including the discharge port 13 is located close to the end portion of the desk 11. In this state, when the attachment units 23 are inserted deep into the insertion slot 14, the attachment units 23 are inserted until the abutting portions 24*a* of the insertion members 24 abut on the front-face exterior 10*a* including the discharge port 13 of the printer 10. That is, a positional relation is possible in which the abutting portions 24*a* also abut on the front end portion of the desk 11. In this way, in a case where the user accidentally applies downward static pressure to the attachment units 23, it is possible to support the attachment units 23 not only with the printer main body but also with the end portion of the desk 11, and to disperse the static pressure, so that breakage of the attachment units 23 can be suppressed. Note that the abutting portions 24*a* of the insertion members 24 can disperse static pressure as long as the abutting portions 24*a* abut on part of the face of the desk 11 on the end portion side, and the size of the abutting portions 24*a* is not limited to that shown in the drawings.

In addition, by placing the printer 10 at the end portion of the desk 11, it is also possible to suppress formation of a step between the discharge port 13 and the desk 11 in the Y direction. That is, it is possible to suppress generation of jamming due to a step. Note that although the printer 10 is preferably placed such that the front-face exterior 10*a* of the printer 10 becomes flush with the end portion of the desk 11, the printer 10 may be placed at a position displaced from the end portion of the desk 11 in connection with the shape of the end portion of the desk 11, or the like.

In this way, the printing medium accommodating apparatus 20 of the present embodiment can be mounted on the printer 10 by attaching the attachment units 23, and removed from the printer 10 by removing the attachment units 23. Hence, the printing medium accommodating apparatus 20 can be removed from the printer 10 in a case where the printing medium accommodating apparatus 20 is unnecessary, during transportation, and similar cases.

The method for mounting the printing medium accommodating apparatus 20 on the printer 10 by the user is as described below. First, the printer 10 is placed such that the front-face exterior 10*a* including the discharge port 13 is located close to the end portion of the desk 11. Thereafter, two sets of the attachment units 23 are inserted deep into the insertion slots 14. The bag-shaped portion of the folded stitch of the accommodating cloth 21 is passed onto the holding portion 22*a* of the rod member 22, and the hanging strings 21*a* on the opposite side are hung on the two hooks 13*a* of the printer 10. Then, the end portions of the rod member 22 are inserted into the cylindrical shapes of the turning members 25, and fixed with a screw or the like, so that the mounting of the printing medium accommodating apparatus 20 to the printer 10 is completed.

Note that although the example in which the user passes the bag-shaped portion of the folded stitch of the accommodating cloth 21 onto the holding portion 22*a* of the rod member 22 has been described, if the printing medium accommodating apparatus 20 is shipped in the state where the bag-shaped portion of the accommodating cloth 21 has already been passed onto the rod member 22 at the time of shipment, the number of steps of assembly conducted by the user can be reduced. In addition, although the method for fixing the rod member 22 and the turning member 25 has been described with the fixation method using a screw as an example, attachment using press-fitting, a claw shape, or the like may be employed as described above.

<Method for Using the Printing Medium Accommodating Apparatus>

Figure 9B:
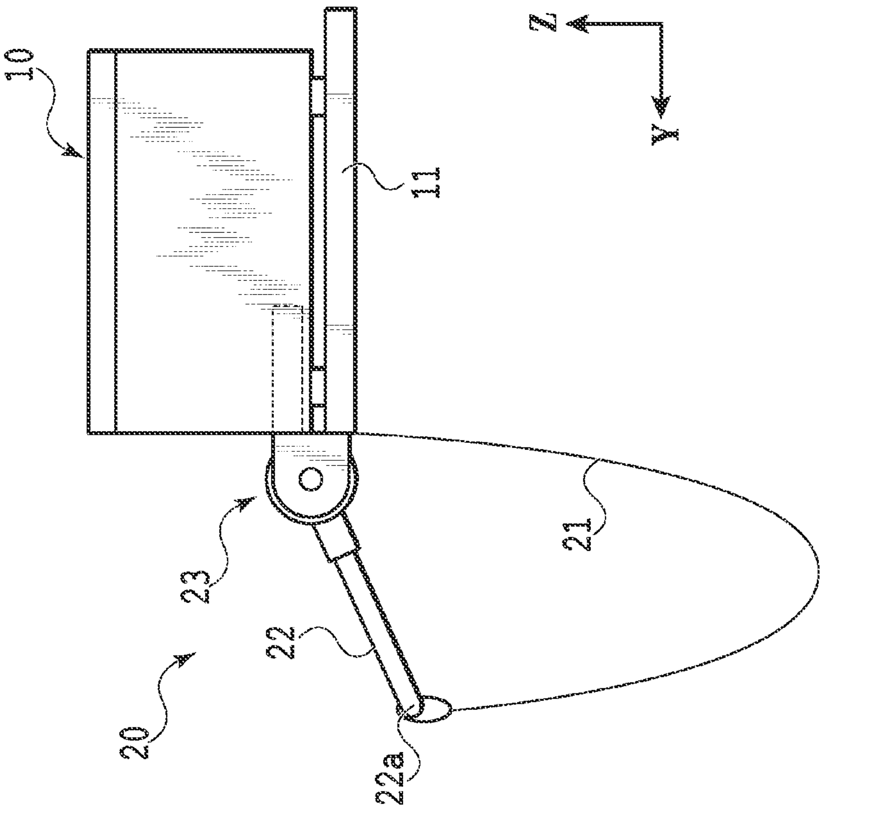
FIGS. 9A and 9B are each a side view for explaining a method for using the printing medium accommodating apparatus.
Figure 9A:
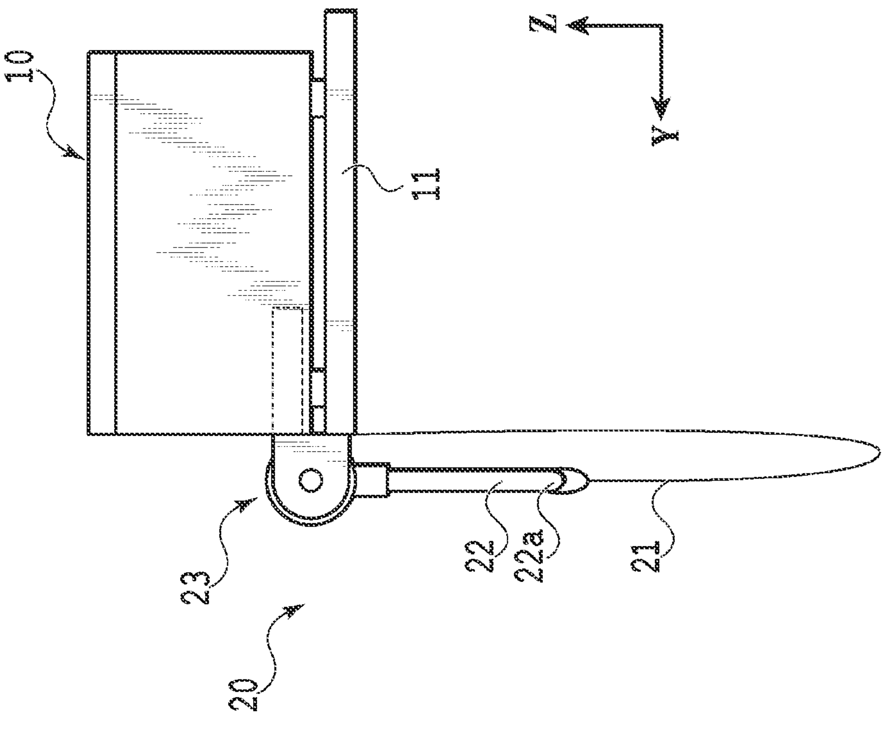

FIGS. 9A and 9B are each a side view for explaining the method for using the printing medium accommodating apparatus 20 mounted on the printer 10. FIG. 9A shows a storage position in a case where the printing medium accommodating apparatus 20 is not used. FIG. 9B shows a discharge position in a case where the printing medium accommodating apparatus 20 is used. FIGS. 9A and 9B each show a state where the accommodating cloth 21 is mounted on the rod member 22 and the printer 10, the attachment units 23 are attached to the printer 10, and the rod member 22 is mounted on the attachment units 23.

As already described above, the rod member 22 and the turning members 25 are integrated by using a screw or the like. In addition, since the turning member 25 is receiving side pressure from the sliding member 26 which is biased by the elastic member 27, it is possible to fix the turning member 25 at a desired turned position. It is possible for the user to manually operate the holding portion 22*a* with the accommodating cloth 21 passed on the rod member 22 to turn the rod member 22 to a desired position. As shown in FIG. 9A, in a case where the printing medium accommodating apparatus 20 is not used, the rod member 22 is moved to the storage position. The storage position refers to a state where the rod member 22 extends downward (the state of the position pointing to "6" of a clock) as viewed from the side face of the printing medium accommodating apparatus 20 as shown in FIG. 9A. The reason why the printing medium accommodating apparatus 20 can be turned to the storage position is that the printer 10 and the printing medium accommodating apparatus 20 may be used at any desired setting position. In other words, it is assumed that the printer 10 is placed at the end portion of the desk 11 at any position in the present embodiment as described above. In this case, there is a case where the printing medium accommodating apparatus 20 occupies a passage of an office or the like depending on the setting environment of the user. The printing medium accommodating apparatus 20 of the present embodiment is configured such that the rod member 22 can be turned to and fixed at a desired position. Hence, in a case where the printing medium accommodating apparatus 20 is not used, it is possible to prevent the printing medium accommodating apparatus 20 from interrupting the action of the user by turning the rod member 22 to the storage position.

On the other hand, in a case where the printing medium accommodating apparatus 20 is used, the user turns the rod member 22 by manually operating and bringing up the rod member 22 to move the rod member 22 to the discharge position as shown in FIG. 9B. In this way, it is possible to accommodate the discharged printing medium S in the accommodating cloth 21 formed in a substantially U shape.

Note that the positions to which the rod member 22 can be turned are not limited to the example shown in FIGS. 9A and 9B. For example, the discharge position may be above or below the position shown in FIG. 9B. The position may be a position at which the holding portion 22*a* of the rod member 22 is located higher than the horizontal state. In any case, the position only has to be a position that allows the discharged printing medium to be accommodated.

<Discharge Position of Printing Medium Accommodating Apparatus>

Figure 10B:
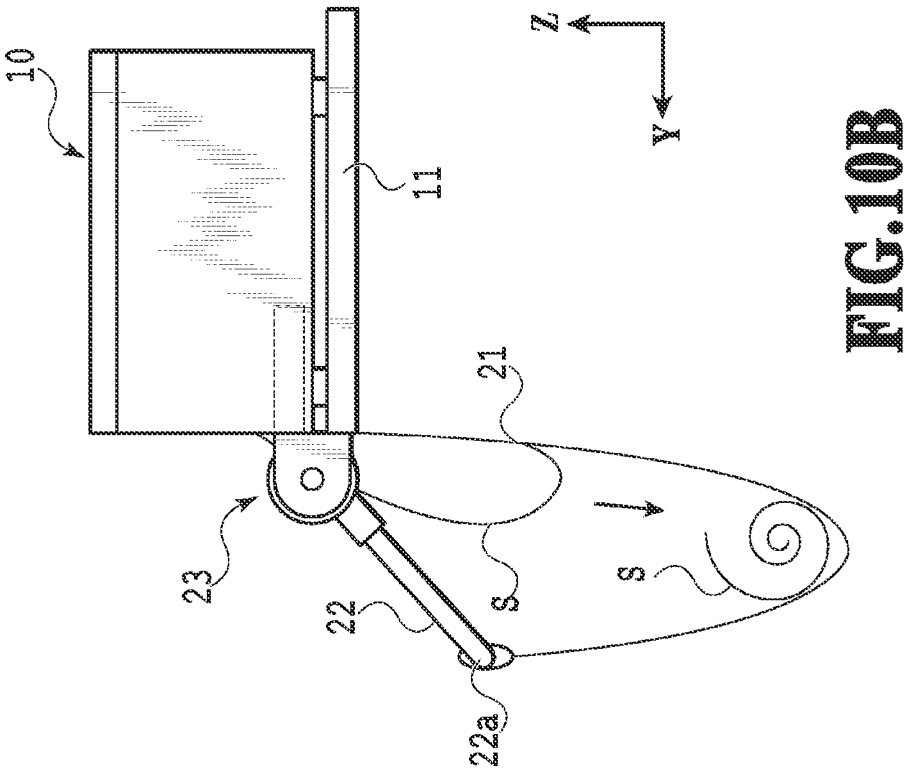
FIGS. 10A and 10B are each a diagram for explaining a discharge position.
Figure 10A:
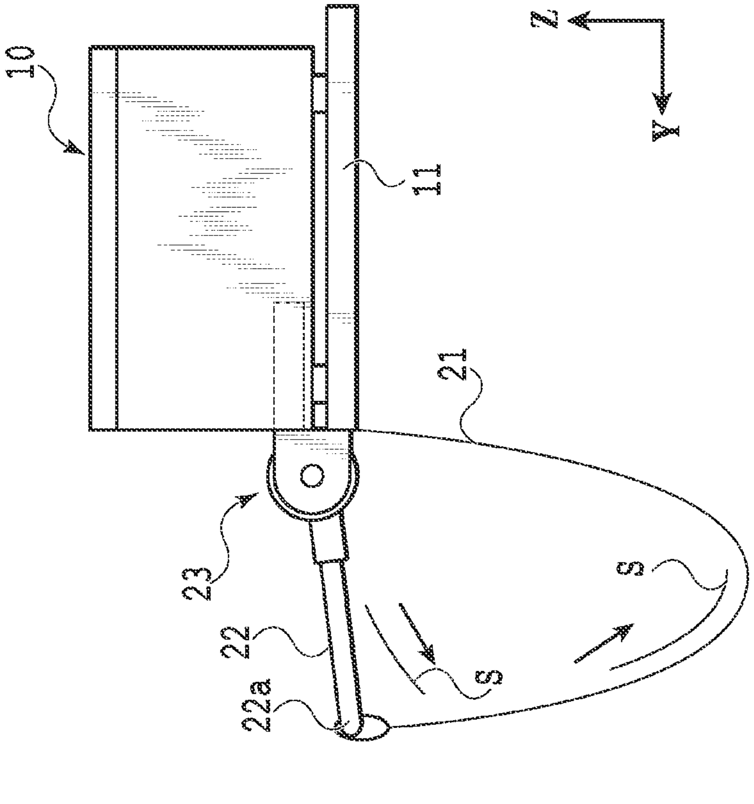

FIGS. 10A and 10B are each a diagram for explaining the discharge position of the printing medium accommodating apparatus 20. As described above, the rod member 22 is configured to be turnable to a desired position by means of the turning member 25. Here, an example in which the turn position to which the rod member 22 of the printing medium accommodating apparatus 20 is turned may be changed depending on a difference in printing conditions is described by using FIGS. 10A and 10B. FIG. 10A is a diagram showing a state where the rod member 22 has been moved to such a turn position that the position in the Y direction of the holding portion 22*a* of the rod member 22 on which the bag-shaped portion at the one end of the accommodating cloth 21 has been passed is more distant from the discharge port 13 than the position shown in FIG. 10B.

The behavior of the printing medium at the time of discharge can vary depending on the printing medium to be discharged. For example, in a case where a sheet of cut paper (A4, A3, or the like) or a sheet of strip paper cut short from a rolled medium is discharged, the printing medium is very light in weight and thus is largely affected by wind from an air conditioner in the room, or the like. For this reason, there is a case where the printing medium does not drop directly below but drops while drifting during dropping. In addition, in a case where an image having high printing duty is printed, cockling occurs in the printing medium, so that there is sometimes a case where the printing medium on which the image has been printed does not bend, and is discharged as it is. Under such printing conditions as described above, if the holding portion 22*a* of the rod member 22 is located at a position close to the printer 10 in the Y direction, there is a possibility that the printing medium is discharged beyond the rod member 22. For this reason, as shown in FIG. 10A, by setting the holding portion 22*a* of the rod member 22 at a turn position close to the horizontal state relative to the desk 11, it is possible to relatively elongate the length of the accommodating cloth 21 in the Y direction. This makes it possible to appropriately accommodate the discharged printing medium S in the printing medium accommodating apparatus 20.

On the other hand, in a case where a printing medium on which an image has been printed in a long size (A1, A0, or the like) from a rolled medium is discharged, the weight of the printing medium itself is also heavy, and is likely to curl. For this reason, the printing medium S discharged from the discharge port 13 is discharged while the leading end of the printing medium S is in contact with the accommodating cloth 21. In addition, because of its long length, as the depth of the printing medium accommodating apparatus 20 in the Z direction is deeper, the printing medium S is less likely to go beyond the printing medium accommodating apparatus 20, and thus can be discharged as appropriate. Hence, in a case where an image in a long size is printed, or similar cases, the printing medium accommodating apparatus 20 is used in a way that the position where the printing medium accommodating apparatus 20 can accommodate the printing medium S is made deeper by setting the position of the holding portion 22*a* of the rod member 22 to a turn position relatively closer to the printer 10 in the Y direction as shown in FIG. 10B.

Although the turn position of the rod member 22 has been described so far by giving specific examples of use, the above-described examples are mere examples. The discharging behavior varies depending on the sheet size, the length of the sheet, the printing pattern, the printing duty, the environment, and the like. For this reason, in the actual practice, the user changes the turn position of the rod member 22 to a position suitable for the printing conditions for use.

As described above, the present embodiment makes it possible to provide a printing medium accommodating apparatus that is applicable to a printing apparatus that can be placed at a desired position. That is, since the printer 10 of the present embodiment is a printer to be placed on the ground face of the desk 11, the degree of freedom in setting position is higher than the case of printers having stand legs. The printing medium accommodating apparatus 20 of the present embodiment can be attached to such a printer as to be placed on a desktop. By using the printing medium accommodating apparatus 20, it is possible to discharge a printing medium while avoiding damage and smear of the printing medium, and occurrence of jamming at the time of printing the next page. In addition, since the provision of the attachment unit 23 makes it possible to mount and remove the printing medium accommodating apparatus 20 on and from the printer 10, the convenience at the time of storage and transportation is improved. Moreover, since the rod member 22 can be maintained at a desired turn position, the user can turn the rod to a suitable position for use depending on the printing conditions.

Second Embodiment

In the second embodiment, the method for fixing the attachment unit 23 and the insertion slot 14 is described in detail. Note that the basic configurations are the same as those in example described in the first embodiment, and different portions mainly are described.

Figure 11:
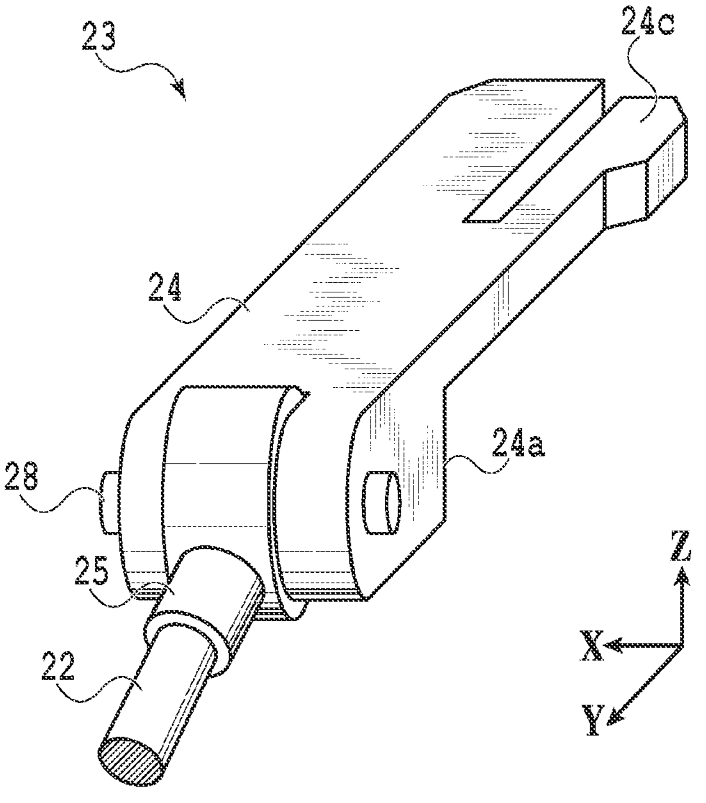
FIG. 11 is a perspective view showing an example of the attachment unit.
Figure 12A:
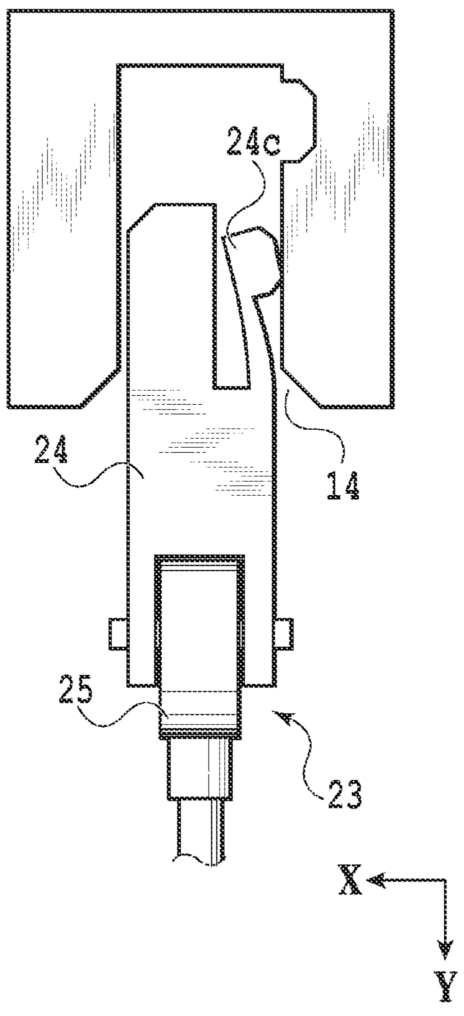
FIGS. 12A and 12B are each a diagram for explaining an example of attaching the attachment unit to an insertion slot.
Figure 12B:
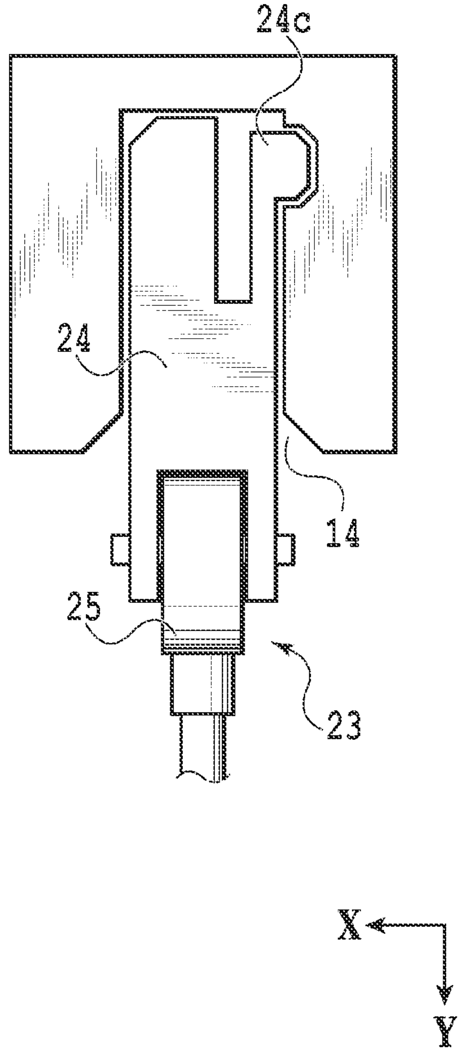

FIG. 11 is a perspective view showing an example of the attachment unit 23 of the present embodiment. FIGS. 12A and 12B are each a diagram for explaining an example of attaching the attachment unit 23 to the insertion slot 14.

As shown in FIG. 11, the attachment unit 23 of the present embodiment is formed to have a plate spring 24*c* at a front end portion of the insertion member 24. At the front end of the plate spring 24*c*, a protruding shape including a taper is formed. In addition, in the insertion member 24, a slit shape is provided near the plate spring 24*c* so as not to interfere when the plate spring 24*c* is bent during insertion. The protruding shape including the taper is formed to protrude on the side opposite to the slit shape.

FIG. 12A is a cross-sectional view showing a state in the middle of inserting the attachment unit 23 into the insertion slot 14 as viewed from above. The edge of the insertion member 24 to be inserted and the entrance of the insertion slot 14 each have a taper shape to be configured such that the insertion member 24 can easily enter during the insertion. Once the plate spring 24*c* passes through the taper shape on the entrance side of the insertion slot 14, the protruding portion of the plate spring 24*c* is pressed by the insertion slot 14, so that the plate spring 24*c* is inserted while being bent as shown in FIG. 12A. As described above, the plate spring 24*c* is configured to be able to retreat to the slit-shaped portion so that the bent portion would not interfere at this time. When the attachment unit 23 is further inserted from the state of FIG. 12A, the straight portion of the front end of the attachment unit 23 abuts on the deep end of the insertion slot 14 as shown in FIG. 12B. In the present embodiment, a depressed shape fitting to the protruding shape of the plate spring 24*c* is formed in the insertion slot 14 in order to cause the front end of the attachment unit 23 to abut on the deep end of the insertion slot 14 and eliminate the bending of the plate spring 24*c*.

As described above, the present embodiment makes it possible to hold the attachment unit 23 with the plate spring 24*c* when the attachment unit 23 is inserted into the insertion slot 14. Hence, it is possible to suppress detachment of the attachment unit 23 at an unintended timing due to vibration of the printer 10 during printing operation or operation of the printing medium accommodating apparatus 20 or the like. Note that although in the present embodiment, the example in which the attachment unit 23 includes the plate spring 24*c* has been described, a configuration is also possible in which the abutting portion of the insertion slot 14 includes the plate spring. In this case as well, the same effects can be obtained.

Third Embodiment

In the third embodiment, a configuration is described in which cam shapes are added to the turning member 25 and the sliding member 26 so that the rod member 22 can be held at two positions, a storage position and a discharge position. In the first embodiment, the example in which the rod member 22 can be fixed at a desired position has been described. Here, there can also be a case where the user has difficulty in finding a desired position or forgets to change the desired position. For this reason, in the present embodiment, it is made possible to hold the rod member 22 at two positions, the storage position and the discharge position. Note that since the basic configurations are the same as those in the example described in the first embodiment, different points are mainly described. In addition, the configuration described in the second embodiment may be combined.

Figure 13A:
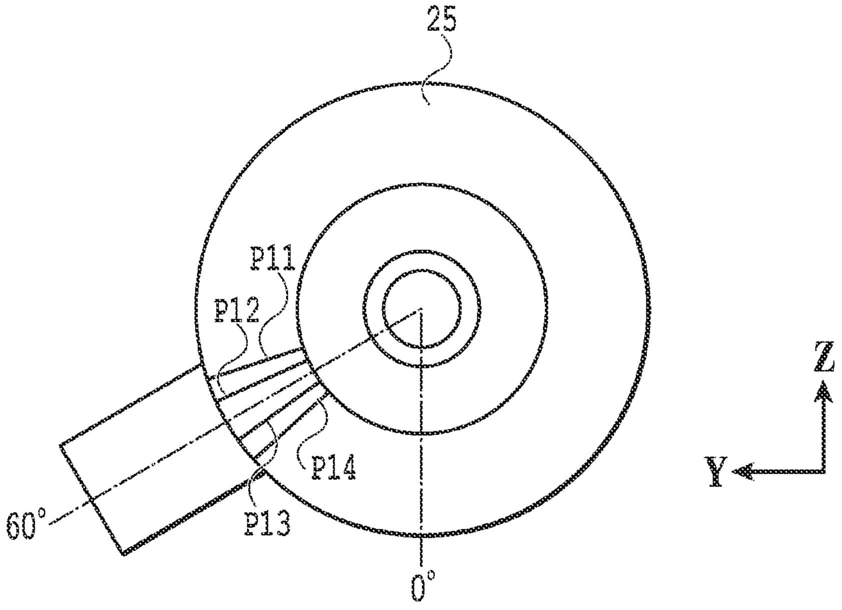
FIGS. 13A and 13B are each a diagram for explaining a turning member.
Figure 13B:
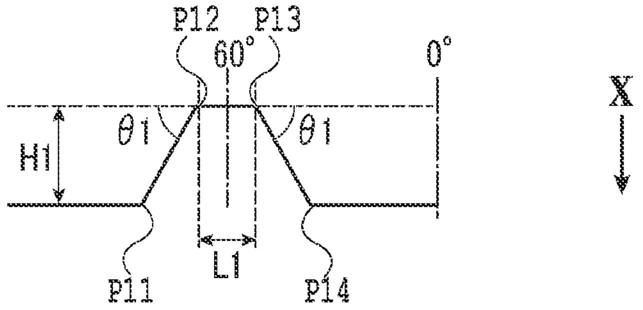
Figure 14A:
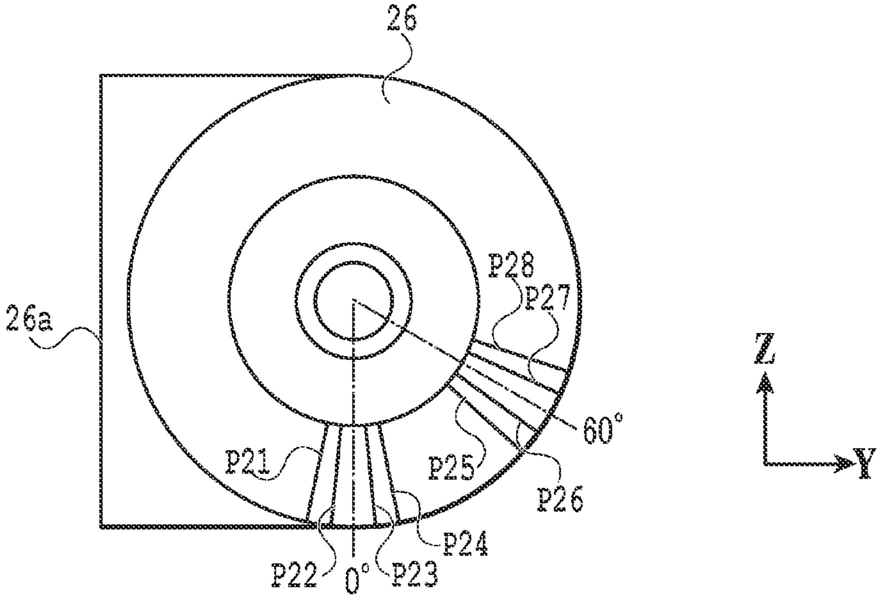
FIGS. 14A and 14B are each a diagram for explaining a sliding member.
Figure 14B:
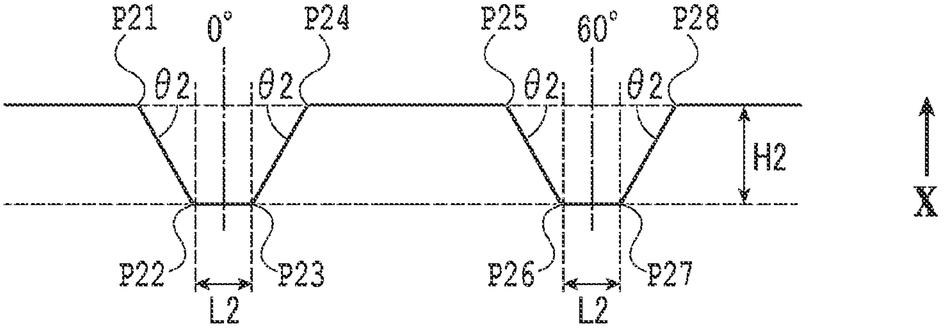

FIGS. 13A and 13B are each a diagram for explaining a turning member 25 of the present embodiment. FIG. 13A is a side view of the turning member 25, and FIG. 13B is a diagram in which part of an arc portion of the turning member 25 is linearly developed. FIGS. 14A and 14B are each a diagram for explaining a sliding member 26 of the present embodiment. FIG. 14A is a side view of the sliding member 26, and FIG. 14B is a diagram in which part of an arc portion of the sliding member 26 is linearly developed.

As shown in FIGS. 13A and 13B, the turning member 25 has a convex cam shape at the same phase as the cylindrical shape into which the rod member 22 is inserted. The convex cam shape is a shape that protrudes in the −X direction. In FIG. 13A, the convex portion is formed on the front side of the sheet. The height of the convex cam shape, the inclination of the raised cam, and the width of the convex portion are represented by H1, θ1, and L1, respectively. Positions P11 to P14 in FIG. 13A correspond to positions P11 to P14 in FIG. 13B, respectively.

As shown in FIGS. 14A and 14B, concave cam shapes are formed at two portions in the sliding member 26. The concave cam shapes are each a shape that is concave in the −X direction. In FIG. 14A, the concave portions are formed on the back side of the sheet. One of the concave cam shapes is at the storage position, while the other is at the discharge position. In the present embodiment, an example in which the storage position is set at a position of 60° when the −Z direction is deemed as 0° is described. The height of the concave cam shapes, the inclination of the concave cams, and the width of the concave portions are represented by H2, θ2, and L2, respectively. Positions P21 to P28 in FIG. 14A correspond to positions P21 to P28 in FIG. 14B, respectively.

As described in the first embodiment, since the sliding member 26 comes into contact with the holder 24*b* of the insertion member 24 to be held without rotating, the turning member 25 is configured to rotate while receiving side pressure from the sliding member 26. In the present embodiment, since the convex cam shape is formed in the turning member 25 on the sliding member 26 side, the turning member 25 turns while pressing and expanding the sliding member 26 in the −X direction at a portion other than the portions corresponding to the concave cam shapes of the sliding member 26.

Figure 15:
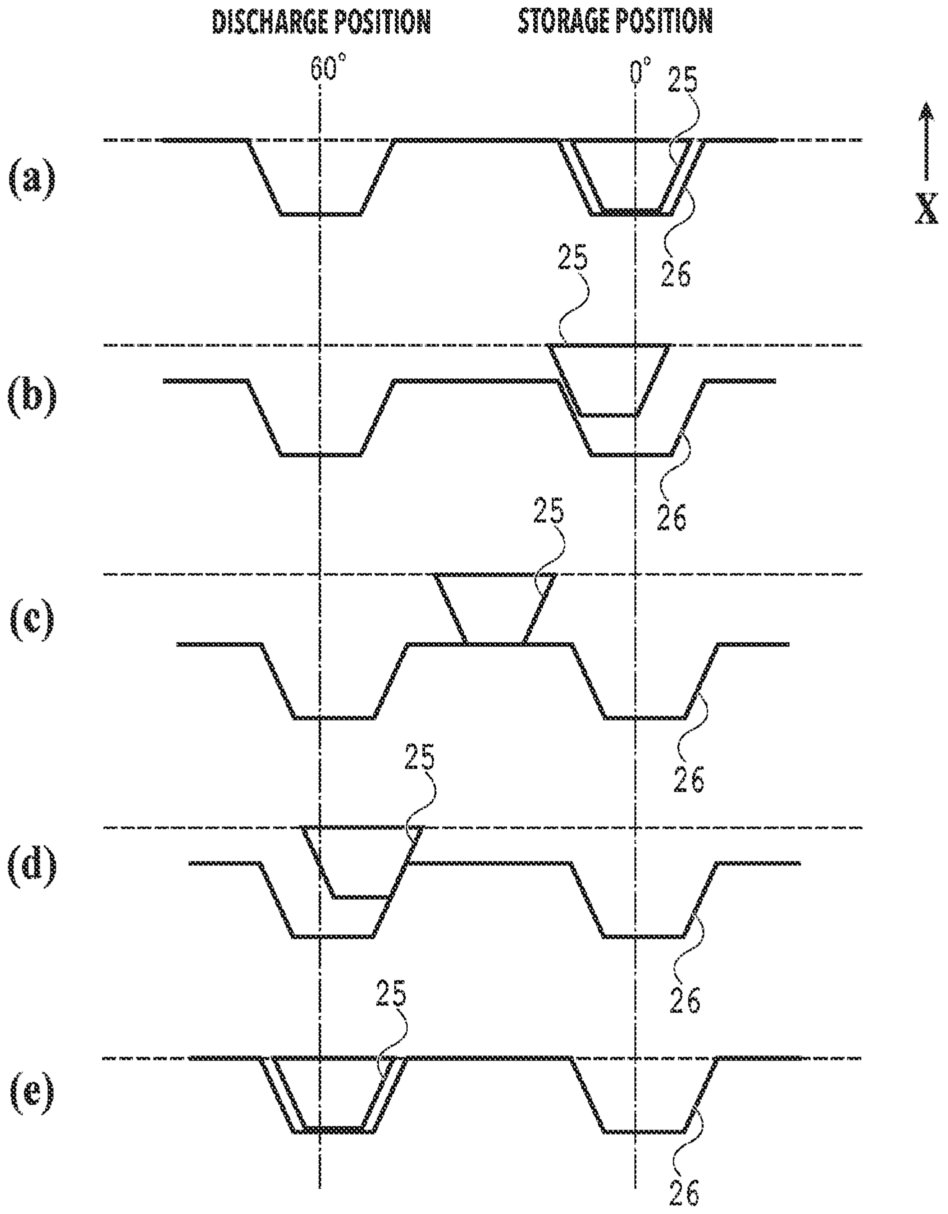
FIG. 15 is a diagram for explaining motion of cams.

FIG. 15 is a diagram for explaining the motion of the cams when the turning member 25 turns from the storage position to the discharge position. As shown at timing (a) in FIG. 15, at the time of the storage position, the turning member 25 is held in a state where the convex cam shape of the turning member 25 is dropped in the concave cam shape at a position of 0° of the sliding member 26. Once the turning member 25 starts being turned toward the discharge position, the inclined face of the concave cam shape and the inclined face of the convex cam shape come into contact, and the sliding member 26 receives the side pressure from the turning member 25 and starts moving in the −X direction as shown at timing (b) in FIG. 15. At this time, the elastic member 27 pressing the sliding member 26 is compressed. After the turning member 25 passes through the inclination of the concave cam shape and further continues turning as shown at timing (c) in FIG. 15, the inclined face of the concave cam shape and the inclined face of the convex cam shape start coming into contact again as shown at timing (d) in FIG. 15. Hence, the sliding member 26 starts moving in the +X direction. After passing through the inclination of the concave cam shape, the turning member 25 is held in a state where the convex cam shape is dropped in the concave cam shape at the position of 60°, which is a discharge position, as shown at timing (e) in FIG. 15.

When the dimensional relation between the convex cam shape and the concave cam shape is such that H2≥H1, L2≥L1, and θ1≥θ2, the convex cam shape can be surely dropped. Here, if H1, H2 are increased, the amount of compression of the elastic member 27 increases, leading to a higher holding force. Moreover, if the angles of θ1, θ2 are increased, the angles of the inclined faces become steeper, so that the component force to move the sliding member 26 in the X direction decreases and the holding force can thus be increased.

In addition, in the present embodiment, it is assumed that the spring pressure or the coefficient of friction is adjusted so that in a case where the user pulls the hand in a state where the convex cam shape has completely climbed the inclined face of the concave cam shape, the rod member 22 can return to the storage position by means of the weight of the rod member 22 itself.

Note that in the present embodiment, although the example in which the convex cam shape is provided in the turning member 25 and the concave cam shape corresponding to the convex cam shape is provided in the sliding member 26 has been described, the present disclosure is not limited to this. A concave cam shape may be provided in the turning member 25 while a convex cam shape is provided in the sliding member 26. That is, it suffices that a first cam shape is provided in the turning member 25 at the side face of the turning member 25 in the direction of the rotation shaft, and a second cam shape corresponding to the first cam shape is provided in the sliding member 26. Then, it suffices that the turning member 25 and the sliding member 26 are arranged in parallel in the direction of the rotation shaft such that the convex shape and the concave shape come into contact, and that the second cam shape is formed at a position fitting to the turn phase of the printing medium accommodating apparatus 20.

As described above, the present embodiment makes it possible to turn the rod member 22 to a fixed position by using the cam shapes. That is, it becomes possible to turn the rod member 22 to the storage position and the discharge position in a fixed manner. Hence, since a user who is not familiar with an appropriate turn position does not have to bear the turn position in mind, the convenience is improved. Note that although the example in which one discharge position is set has been described in the present embodiment, it is also possible to set a plurality of discharge positions. For example, three or more concave cam shapes may be formed.

Fourth Embodiment

The fourth embodiment is an embodiment for explaining the attachment unit 23 of the third embodiment in more detail. Note that the present embodiment may be employed together with the first embodiment or the second embodiment.

FIGS. 16A to 16D are each a diagram for explaining a static load avoiding position. In the present embodiment, an example in which the rod member 22 can turn and move to the static load avoiding position is described.

Figure 16A:
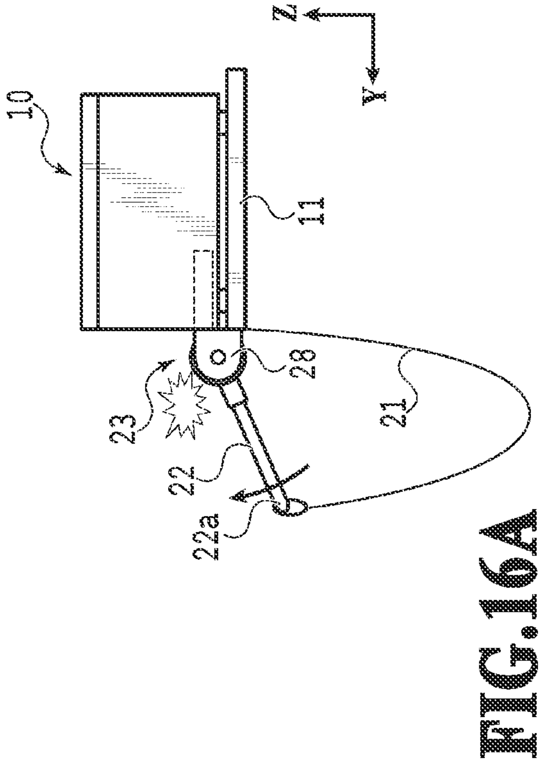
FIGS. 16A to 16D are each a diagram for explaining a static load avoiding position.
Figure 16B:
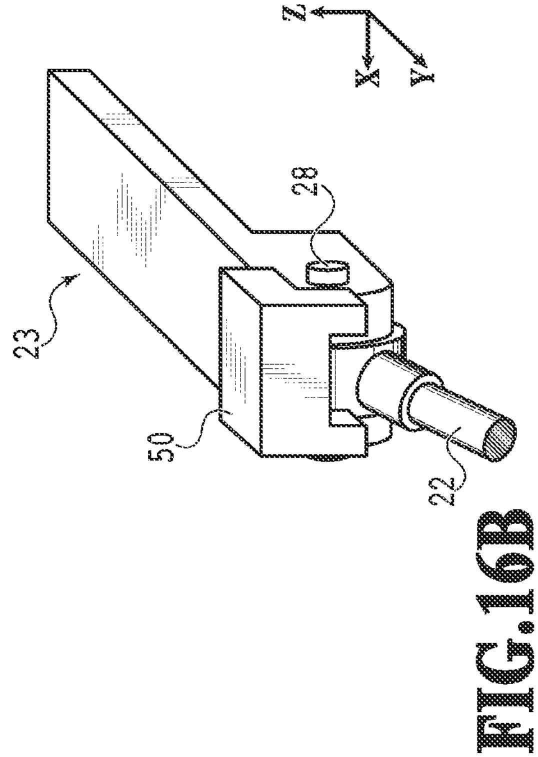

FIG. 16A is a side view of comparative example for explaining the necessity of the static load avoiding position. FIG. 16B is a perspective view of an attachment unit 23 used in this comparative example. As shown in FIG. 16A, there is a possibility that the user turns the rod member 22 clockwise further from the discharge position about the rotation shaft 28 with wrong operation or the like. As shown in FIG. 16B, a cover wall portion 50 is provided in the attachment unit 23 in the comparative example. In the configuration in which the cover wall portion 50 is provided in the attachment unit 23 as in the comparative example, the rod member 22 comes into contact with the cover wall portion 50 and the turning of the rod member 22 becomes restricted. In this restricted state, since a leverage having a length from the end portion of the rod member 22 to the holding portion 22*a* is formed, the operation force of the user acts as a large force on the roots of the attachment units 23 and the rod members 22, and there is a possibility that the components are broken. That is, in a case where a turn restricting mechanism is provided near the center of rotation of the rod member 22, since the distance from the center of rotation to the operating portion (portion of the holding portion 22*a*) of the rod member 22 is large, there is a possibility that a large load is applied to the center of rotation, and the center of rotation is broken.

Figure 16C:
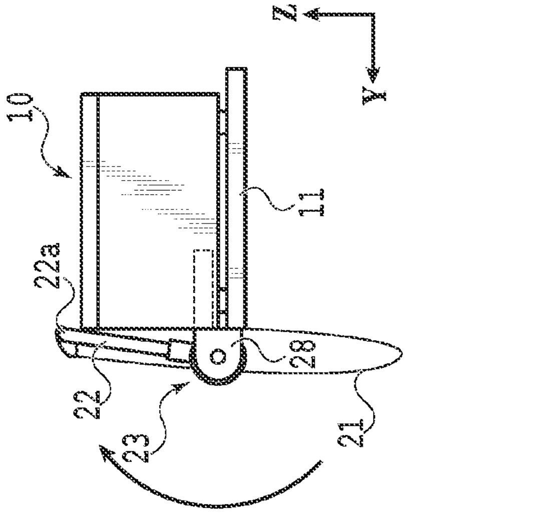
Figure 16D:
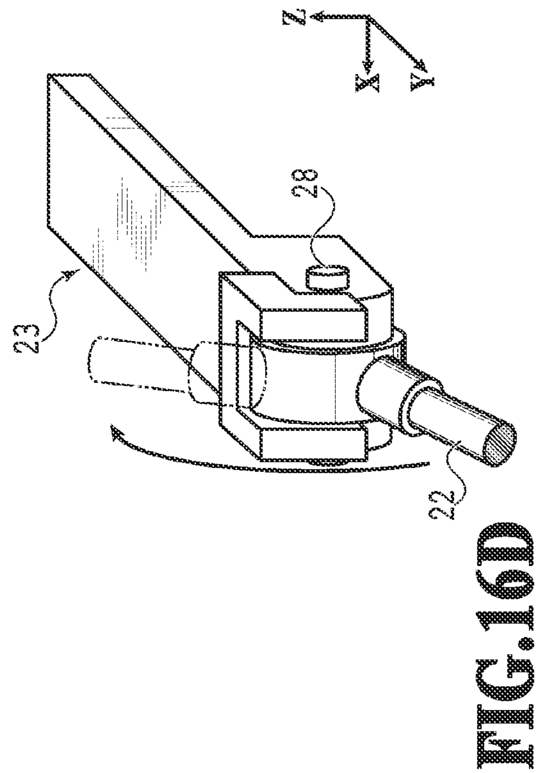

In view of this, in the present embodiment, a static load avoiding position is provided. FIG. 16C is a side view for explaining the static load avoiding position in the present embodiment. FIG. 16D is a perspective view of an attachment unit 23 which makes it possible to turn the rod member 22 to the static load avoiding position. In the present embodiment, even in a case where the user has turned the rod member 22 clockwise further from the discharge position about the rotation shaft 28 with wrong operation or the like, the rod member 22 turns and moves to near 180° in a case where the storage position is deemed as 0°. That is, the attachment unit 23 of the present embodiment is not provided with a mechanism that restricts the operation of turning by nearly 180° near the center of rotation. Hence, the rod member 22 is configured to be capable of turning to near 180°. Then, when the rod member 22 continues turning from near 180°, the turning of the rod member 22 is restricted at a position where the rod member 22 comes into contact with the printer 10. This position is defined as a static load avoiding position. That is, the static load avoiding position is a position where the rod member 22 can come into contact with the printer 10 placed on the ground face. At this static load avoiding position, the distance to the portion where the holding portion 22*a* of the rod member 22 operated by the user and the main body of the printer 10 come into contact is shorter than the distance between the holding portion 22*a* of the rod member 22 and the cover wall portion 50 in comparative example. For this reason, in the static load avoiding position of the present embodiment, the effect of the leverage is smaller than comparative example, and a large force is unlikely to act. In addition, the force acts on the main body of the printer 10, which has a higher rigidity. Hence, the possibility that a component is broken becomes low.

In addition, in the present embodiment, the rod member 22 may be configured to be capable of turning counter-clockwise about the rotation shaft 28 further from the storage position at which the rod member 22 is hung in the vertically downward direction. For example, this is for preventing static pressure from being applied to the rod member 22 and the attachment unit 23 by the user accidentally pressing a chair or the like under the desk 11. In the present example, the rod member 22 is configured to be capable of turning counter-clockwise by about 30° from the storage position. This position can also be defined as a static load avoiding position. In the case where the turning counter-clockwise from the storage position is restricted, there is a possibility that the attachment unit 23 is broken as in a case of the example described in FIG. 16A. Hence, the configuration in which the rod member 22 can turn counter-clockwise further from the storage position allows force to be released and breakage to be avoided.

As described above, in the present embodiment, since the rod member 22 can be turned to the static load avoiding position, it is possible to suppress occurrence of breakage in the components.

Fifth Embodiment

In the fifth embodiment, an example in which although the rod member 22 can be turned and moved to the static load avoiding position described in the fourth embodiment, the rod member 22 is not held at the static load avoiding position is described. When the user moved the rod member 22 to the static load avoiding position and then the rod member 22 is held at this static load avoiding position as in FIG. 16C described in the fourth embodiment, an unfavorable phenomenon sometimes occurs. For example, when the rod member 22 is kept being held at the static load avoiding position by leaning on the printer 10 due to gravity even after the user takes the hand off the rod member 22, the accommodating cloth 21 keeps closing the discharge port 13 for sheets. If the user accidentally executed printing in this state, the printing medium S thus discharged could come into contact with the accommodating cloth 21, possibly causing jamming.

FIGS. 17A to 17D are each a diagram for explaining an example in which the rod member 22 is not held at the static load avoiding position in the present embodiment. FIGS. 18A to 18D are each a diagram for explaining the position and cam shape of the rod member 22. FIGS. 18A to 18D are diagrams showing states corresponding, respectively, to FIGS. 17A to 17D. The present embodiment is described based on an example in which a convex cam shape is formed in the turning member 25 and a concave cam shape is formed in the sliding member 26 as described in the third embodiment.

Figure 17B:
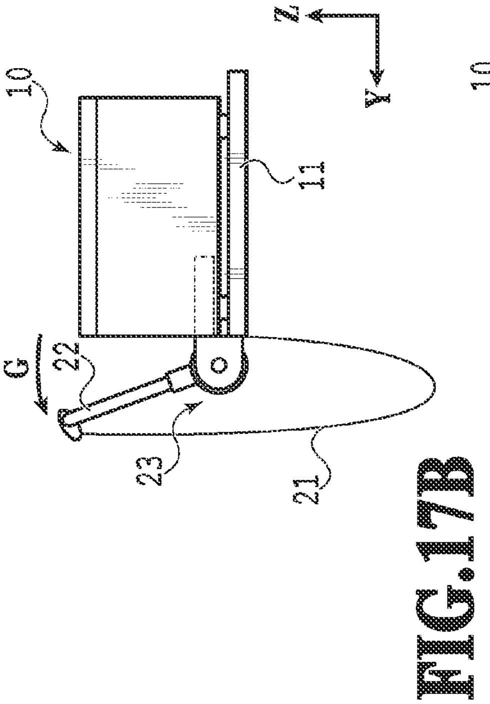
FIGS. 17A to 17D are each a diagram for explaining an example in which a rod member is not held at the static load avoiding position.
Figure 17D:
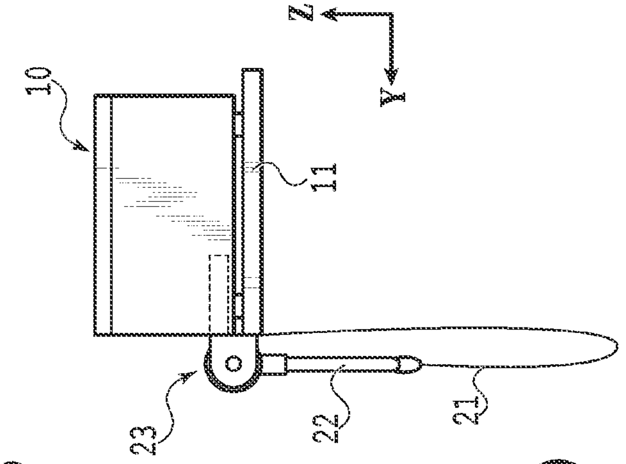
Figure 17A:
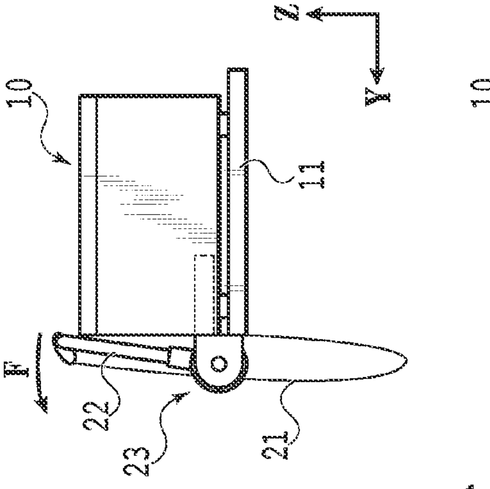
Figure 17C:
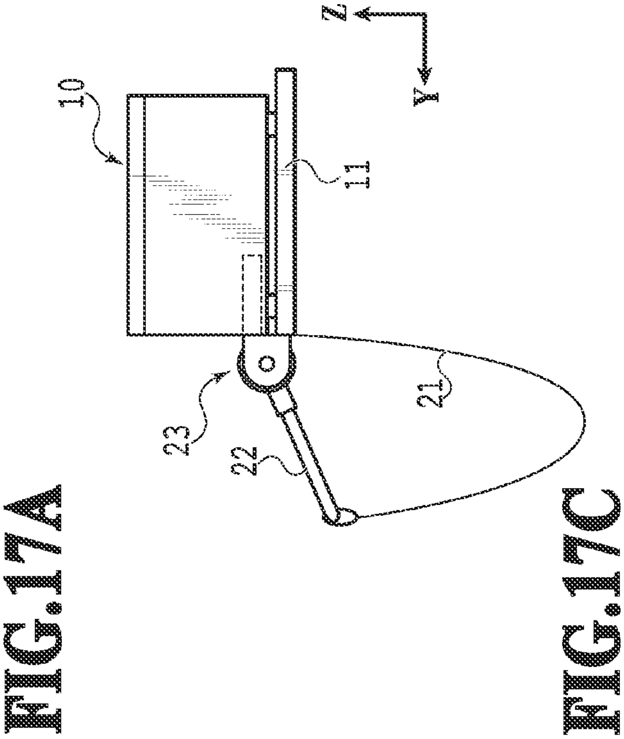
Figure 18A:
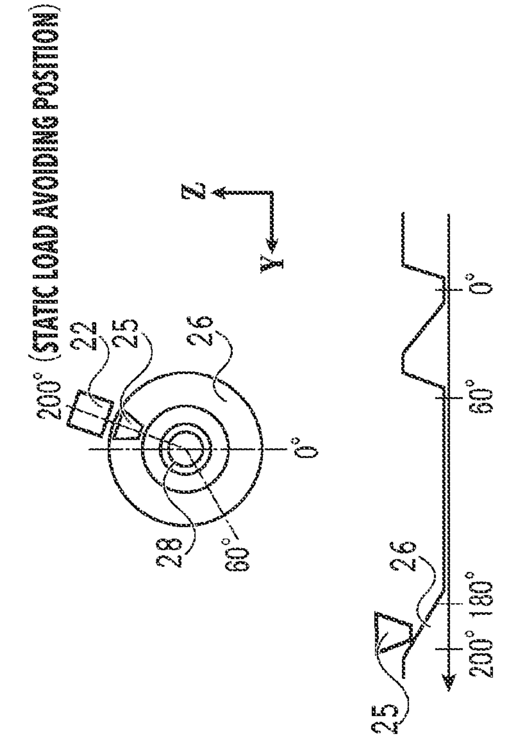
FIGS. 18A to 18D are each a diagram for explaining a position of the rod member and cam shapes.
Figure 18B:
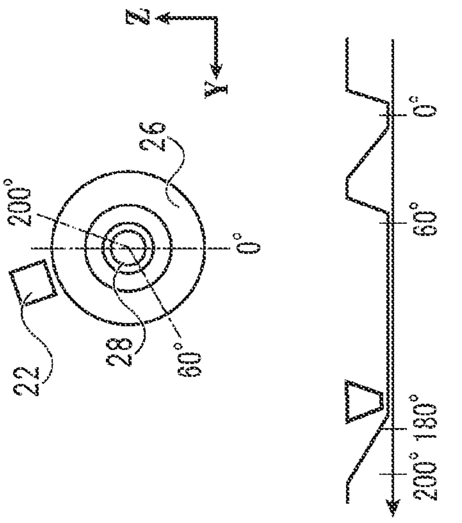
Figure 18C:
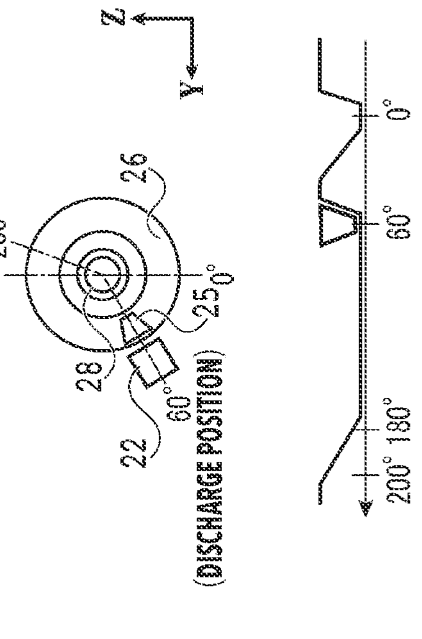
Figure 18D:
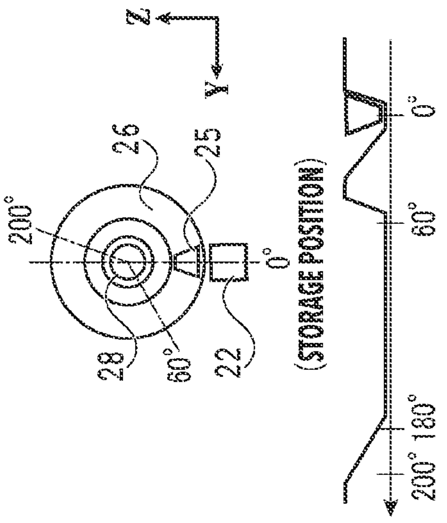

The present embodiment is configured such that, as shown in FIG. 17A, a turning force F is applied at the static load avoiding position to turn the rod member 22 counter-clockwise. FIG. 18A is a schematic diagram for the position and the cam shape at this time of the rod member 22 at the static load avoiding position shown in FIG. 17A. In FIGS. 18A to 18D, only the convex cam shape portion of the turning member 25 is shown for description. In FIG. 18A, the turning member 25 is located on the middle of the cam inclined face of the sliding member 26. Since the turning member 25 is receiving force to be pressed into contact with the sliding member 26 by the elastic member 27 (not shown in FIGS. 18A to 18D), the turning member 25 receives force to descend the cam inclined face by the component force of the cam inclined face. That is, as shown in FIG. 17A, the rod member 22 turns counter-clockwise. FIG. 17B shows the position after rotation to descend on the cam inclined face, and FIG. 18B shows the state of the cam at this time. At this position, the rod member 22 receives a turning force G by gravity to further continue rotating counter-clockwise, and moves to the discharge position as shown in FIG. 17C. At the discharge position, as shown in FIG. 18C, the turning member 25 comes into contact with the cam of the sliding member 26, and thus this state is maintained. In this way, even when the user moves the rod member 22 from the discharge position to the static load avoiding position due to wrong operation or the like, the rod member 22 is not held at the static load avoiding position but automatically moves to the discharge position once the user takes the hand off. Hence, it is possible to prevent the discharged printing medium from colliding with the rod member 22 to cause jamming. Note that as described in first embodiment, third embodiment, or the like, when finishing the use of the printer 10, the user moves the rod member 22 to the storage position as shown in FIG. 17D and FIG. 18D to finish the use.

As described above, in the present embodiment, since the rod member 22 is not held at the static load avoiding position, it is possible to suppress discharging of the printing medium S in a state where the discharge port 13 is closed. Note that even in a case where such a static load avoiding position that the rod member 22 enters under the desk 11 is provided as described in the fifth embodiment, it is possible to prevent the rod member 22 from being held at the static load avoiding position by using the same mechanism.

Sixth Embodiment

In the second embodiment, the example in which the attachment unit 23 and the insertion slot 14 are fixed by using the plate spring has been described. In the present embodiment, an example in which the attachment unit 23 and the insertion slot 14 are fixed by using a configuration different from that in the second embodiment is described. The basic configurations are the same as those in the first embodiment, and differences from the first embodiment are mainly described below. Note that the present embodiment may be combined with the modes described in the third embodiment to the fifth embodiment.

Figure 19C:
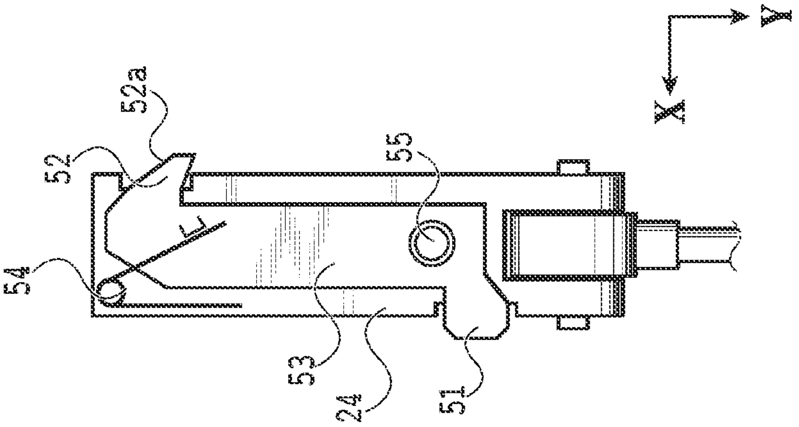
FIGS. 19A to 19C are each a diagram for explaining an attachment unit.
Figure 19B:
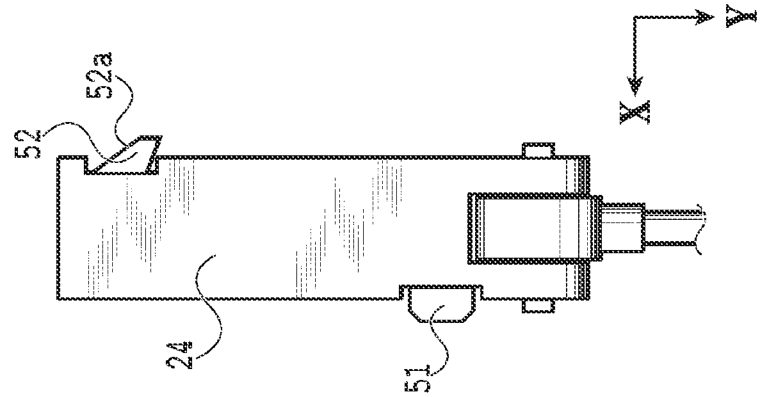
Figure 19A:
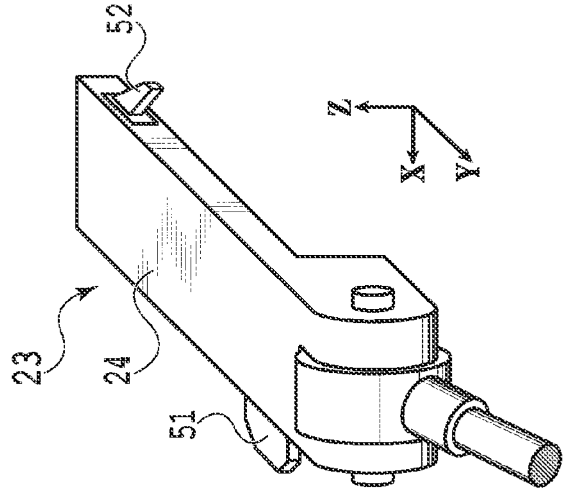
Figure 20A:
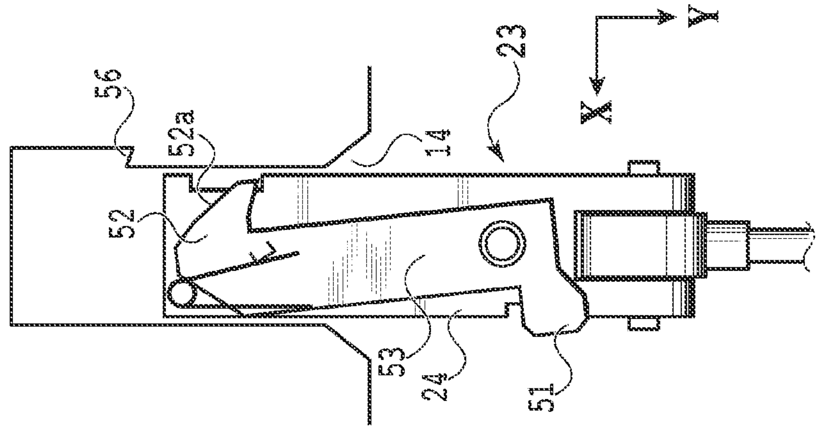
FIGS. 20A to 20C are each an explanatory diagram at the time of attaching the attachment unit to the insertion slot.
Figure 20B:
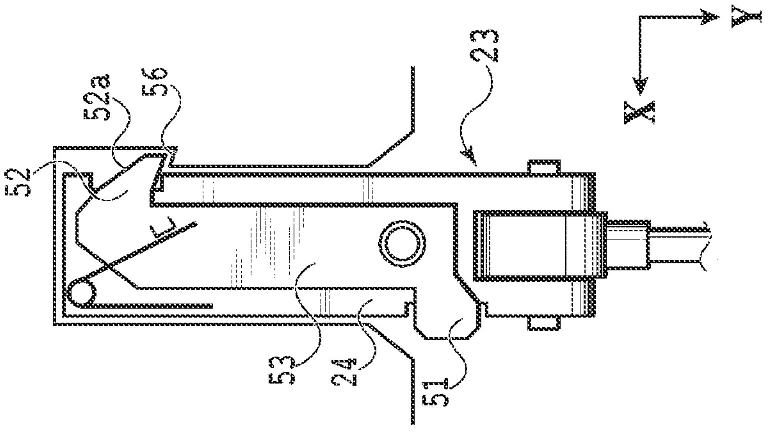
Figure 20C:
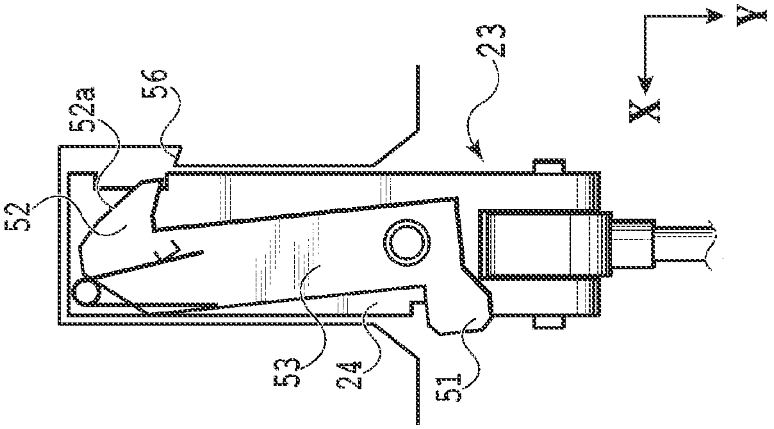

FIGS. 19A to 19C are each a diagram for explaining the attachment unit 23 of the present embodiment. FIGS. 20A to 20C are each an explanatory diagram at the time of attaching the attachment unit 23 to the insertion slot 14. Hereinafter, the present embodiment is described by using FIGS. 19A to 19C and FIGS. 20A to 20C.

FIG. 19A is a perspective view of the attachment unit 23 of the present embodiment. The attachment unit 23 includes a hook portion 52 on aside face near the front end of the insertion member 24. In addition, the attachment unit 23 includes a button portion 51 on a side face on the opposite side to the face on which the hook portion 52 is provided, on the near side portion of the insertion member 24. FIG. 19B is a top view of the attachment unit 23. FIG. 19C is a top view showing the internal structure of the attachment unit 23.

As shown in FIG. 19C, the button portion 51 and the hook portion 52 are parts of an integrated lever member 53. The lever member 53 is receiving force clockwise on the sheet surface about a center of rotation 55 by a spring member 54. In this way, the hook portion 52 is exposed from the side face of the attachment unit 23. By pressing the button portion 51 against the load of the spring member 54, the hook portion 52 is turned in the counter-clockwise direction about the center of rotation 55 to retreat to the inside of the attachment unit 23.

An example in which the attachment unit 23 is attached to the insertion slot 14 is described by using FIGS. 20A to 20C. An inclined face is formed near the entrance of the insertion slot 14, and the front end of the hook portion 52 is formed into an inclined face shape 52*a*. Hence, the attachment unit 23 can be easily inserted into the insertion slot 14 as shown in FIG. 20A. When the attachment unit 23 abuts on the deep inner side of the insertion slot 14 as shown in FIG. 20B, an engagement portion 56, which engages with the hook portion 52, allows the hook portion 52 to be engaged. For this reason, it is possible to suppress detachment of the attachment unit 23 at an unintended timing. In addition, since the hook portion 52 is separated from the engagement portion 56 by pressing the button portion 51 against the spring member 54 as shown in FIG. 20C, the attachment unit 23 can be easily removed.

As described above, the present embodiment makes it possible to easily attach the attachment unit 23 to the printer 10 and remove the attachment unit 23 from the printer 10.

Seventh Embodiment

In the seventh embodiment, a mode for suppressing breakage of the attachment unit 23 is described. The basic configurations are the same as those in the first embodiment, and differences from the first embodiment are mainly described below. In addition, the present embodiment may be combined as appropriate with the modes described in the second embodiment to the sixth embodiment.

Figure 21A:
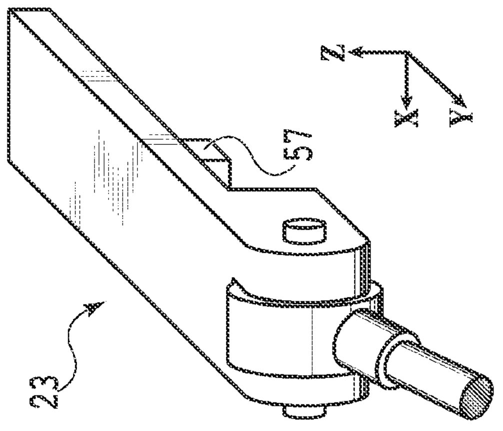
FIGS. 21A and 21B are each a diagram for explaining the attachment unit.
Figure 21B:
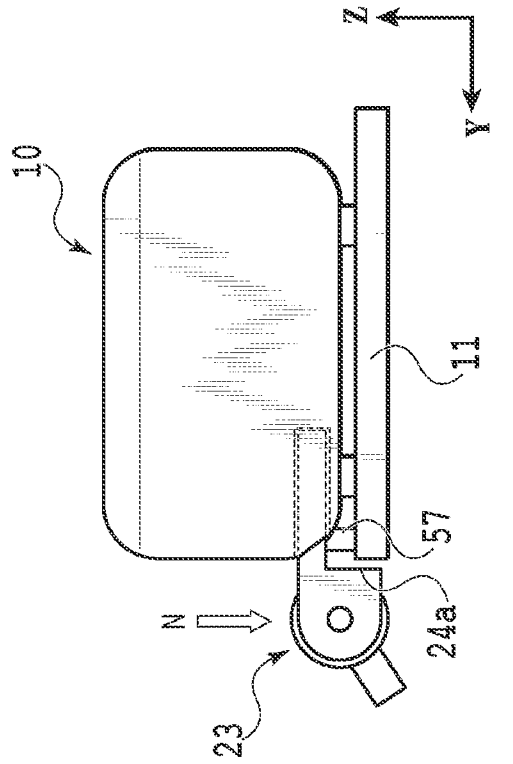

FIGS. 21A and 21B are each a diagram for explaining the attachment unit 23 of the present embodiment. The attachment unit 23 of the present embodiment is configured to suppress breakage of the attachment unit 23 in a case where a load is applied to the attachment unit 23 in the gravitationally downward direction. FIG. 21A is a perspective view of the attachment unit 23. As shown in FIG. 21A, the present embodiment includes an elastic member 57 on a lower face of the attachment unit 23. FIG. 21B is a side view in a state where the attachment unit 23 is attached to the printer 10. As shown in FIG. 21B, although the front end of the attachment unit 23 is inserted into the printer 10, the root of the attachment unit 23 is exposed from the printer 10. If the attachment unit 23 receives a load N in the gravitationally downward direction in this state, there is a possibility that the attachment unit 23 is broken. In the present embodiment, the elastic member 57 provided on the lower face of the attachment unit 23 comes into contact with the desk 11. Since the elastic member 57 supports the attachment unit 23 in this way, the breakage of the attachment unit 23 can be suppressed. In addition, since the elastic member 57 is an elastic body, damage to the desk 11 can also be reduced.

As described above, the present embodiment makes it possible to suppress breakage of the attachment unit 23, and also makes it possible to suppress generation of damage to the desk 11.

Eighth Embodiment

In the present embodiment, another mode of the second attachment unit to attach an accommodating cloth 21 to the printer 10 is described. The basic configurations are the same as those in the example described in the first embodiment, and differences from the first embodiment are mainly described below. Note that the present embodiment may be combined as appropriate with the modes described in the second embodiment to the seventh embodiment.

Figure 22:
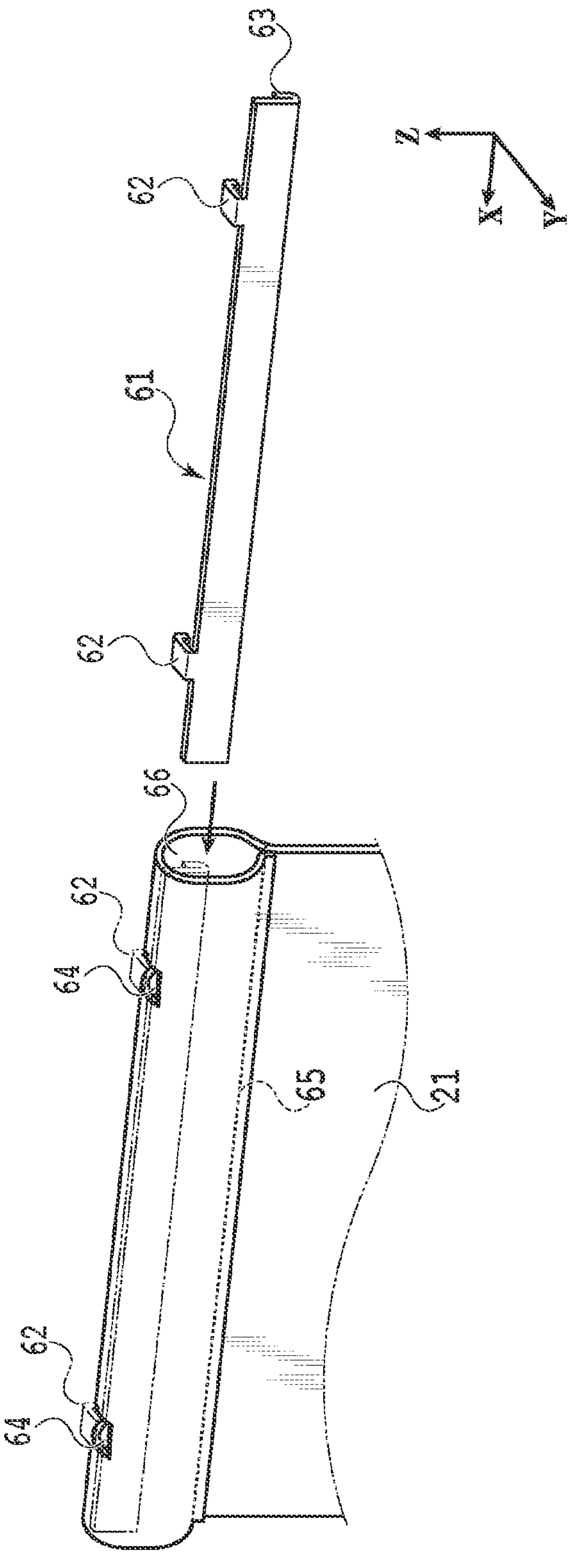
FIG. 22 is a diagram for explaining a hanging member and an accommodating cloth.
Figure 23:
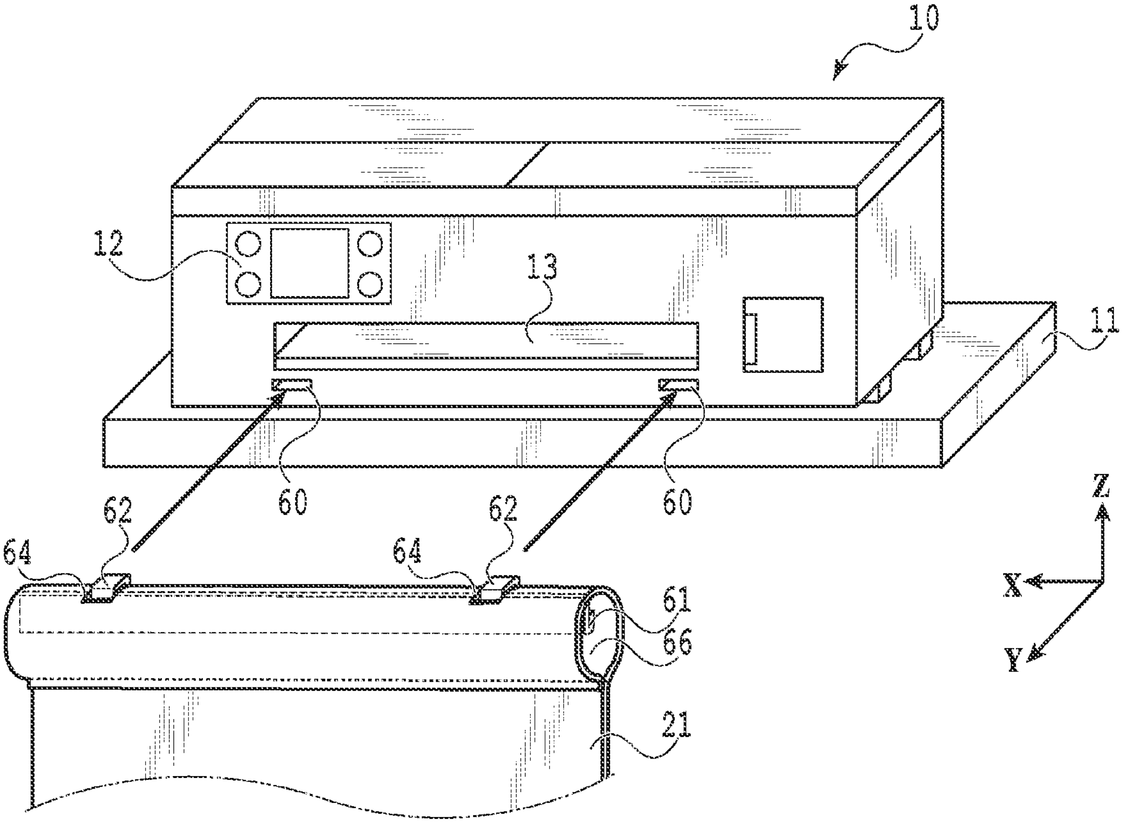
FIG. 23 is a diagram for explaining an example of hanging the hanging member on the printer.
Figure 24B:
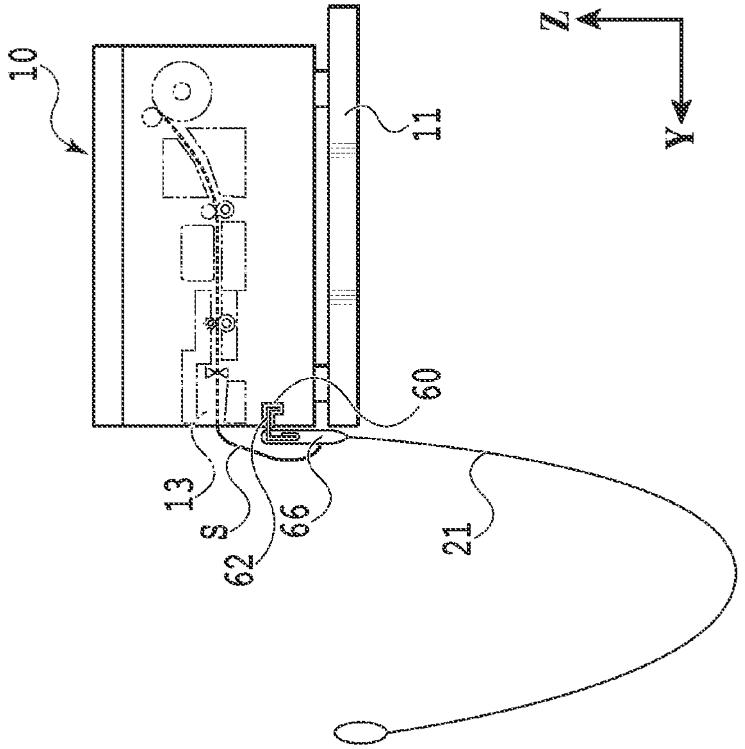
FIGS. 24A and 24B are each a side view showing a state where the hanging member has been hung on the printer.
Figure 24A:
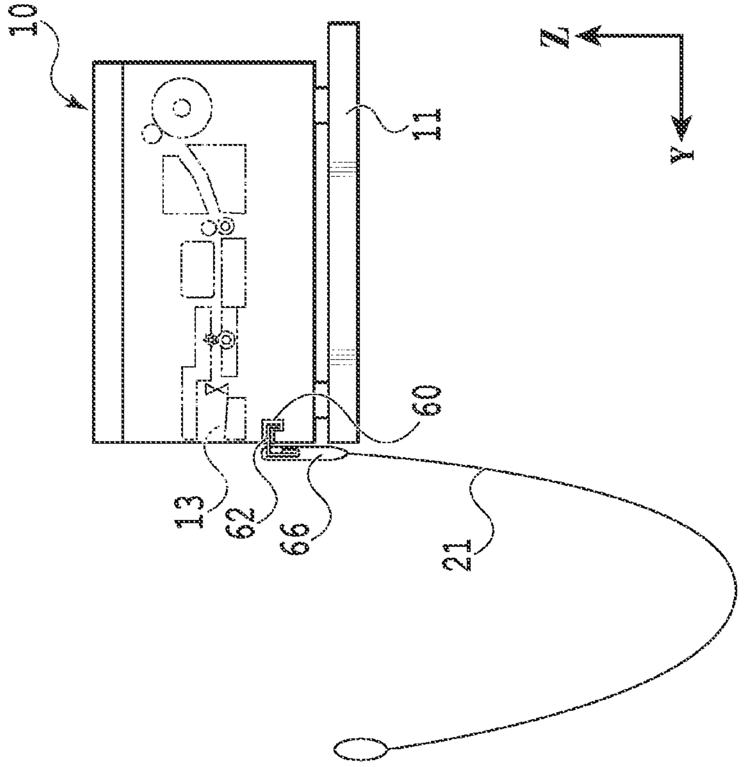

FIG. 22 is a diagram for explaining a hanging member 61 and the accommodating cloth 21 of the present embodiment. FIG. 23 is a diagram for explaining an example of hanging the hanging member 61 on the printer 10. FIGS. 24A and 24B are each a side view showing a state where the hanging member 61 has been hung on the printer 10. Hereinafter, the present embodiment is described by using FIG. 22 to FIGS. 24A and 24B.

In the present embodiment, a configuration of suppressing generation of a gap between the accommodating cloth 21 and the printer 10 in a case where the accommodating cloth 21 is bent is described. This makes it possible to suppress occurrence of jamming in a gap, which would be accidentally generated between the accommodating cloth 21 and the printer 10.

In the present embodiment, a sheet metal having high rigidity is passed through the accommodating cloth 21 to prevent a gap from being generated between the accommodating cloth 21 and the printer 10. As shown in FIG. 22, there is a seam 65 formed by folding back the end portion of the accommodating cloth 21 to form a bag shape 66 extending across the width of the accommodating cloth 21, and stitching the accommodating cloth 21 from one end to the other end with a string in this state. This bag shape 66 serves as a holding portion that holds a hanging member 61, which is the second attachment unit. The hanging member 61 is a sheet metal having high rigidity, and hanging portions 62 are formed by bending the sheet metal. If the thickness of the sheet metal is increased, the rigidity increases. However, since this also increases the cost, a thin sheet metal having a thickness of around 1.2 mm is used in the present embodiment. In order to increase the rigidity of the sheet metal, a hem bend 63 is also processed. Note that the hanging member 61 only has to be a material having high rigidity, and is not limited to a sheet metal. In addition, cutouts 64 are provided at two positions in the bag shape 66 so that the hanging portions 62 can protrude out of the bag shape 66 when the hanging member 61 is held in the bag shape 66. The hanging member 61 is held in the accommodating cloth 21 by passing the hanging member 61 through the side face of the bag shape 66 of the accommodating cloth 21.

The method for hanging the accommodating cloth 21 holding the hanging member 61 in the bag shape 66 to the printer 10 is described by using FIG. 23. As shown in FIG. 23, the hanging member 61 has been passed through the side face of the bag shape 66 and held in the bag shape 66, and the hanging portions 62 have protruded from the cutouts 64. In addition, the printer 10 is provided at two positions with printer-side hanging portions 60 on which the hanging portions 62 are hung. The sizes of the opening portions of the printer-side hanging portions 60 are formed such that the hanging portions 62 can pass therethrough and be hung therein. The hanging portions 62 are hung on the printer-side hanging portions 60 at two positions. In this way, the accommodating cloth 21 is attached to the printer 10.

Next, the positions of the printer-side hanging portions 60 and the effect that paper jamming does not occur during discharge are described by using FIGS. 24A and 24B. FIG. 24A is a diagram of the state where hanging portions 62 have been hung to the printer-side hanging portions 60 as viewed from the side face. FIG. 24B is a side view showing a state where the printing medium S has been discharged. In FIGS. 24A and 24B, the rod member 22 and the attachment units 23 are not shown.

As shown in FIG. 24A, the positions of the printer-side hanging portions 60 are located below the discharge port 13, and above the gap between the desk 11 and the bottom face of the printer 10. In this way, the gap between the desk 11 and the printer 10 is covered with the accommodating cloth 21. This allows the printing medium S to be discharged without causing the leading end of the printing medium S to enter the gap, in a case where the printing medium S is discharged from the discharge port 13, as shown in FIG. 24B. Hence, the present embodiment makes it possible to suppress occurrence of paper jamming which would be caused by the printing medium S entering the gap. In addition, the printer-side hanging portions 60 are located below the discharge port 13 and are formed in an opening depressed to the printer main body side. Hence, it is possible to suppress occurrence of paper jamming as in a case of the example described in the first embodiment.

Ninth Embodiment

In the third embodiment and the like, the configuration in which the cam shapes are provided on the turning member 25 and the sliding member 26, and the rod member 22 can be held at two positions, the storage position and the discharge position, has been described. In the ninth embodiment, another mode using such cam shapes is described. Since the basic configurations are the same as those in the example described in the third embodiment, different points are mainly described. Note that the present embodiment may be combined with the modes described in the second embodiment, and the fourth embodiment to the eighth embodiment.

Figure 25A:
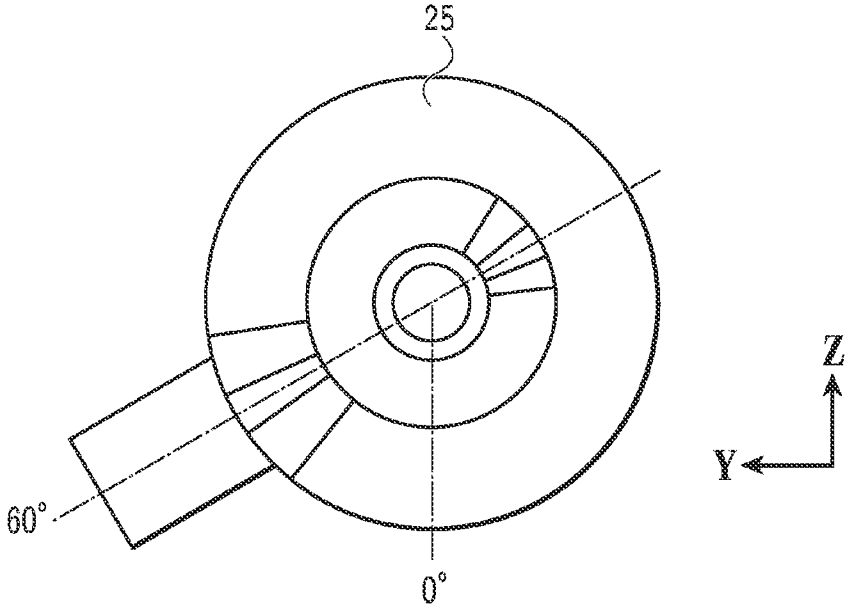
FIGS. 25A and 25B are each a diagram for explaining cam shapes.
Figure 25B:
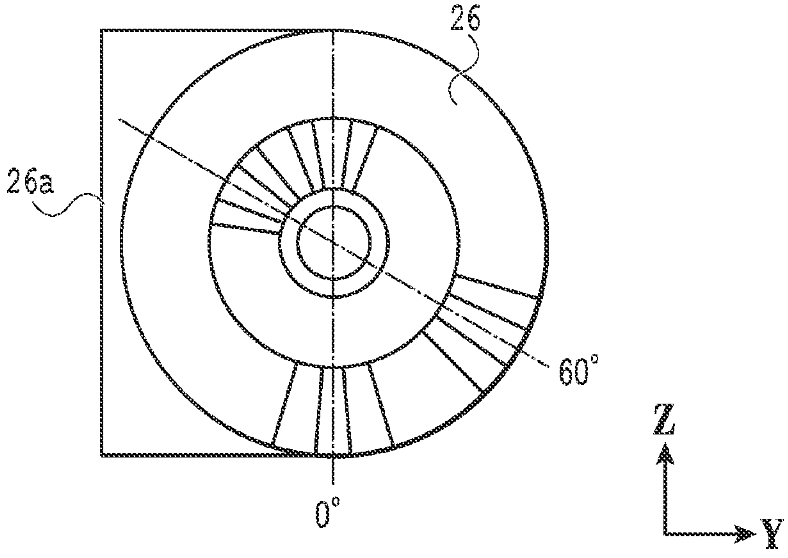

FIGS. 25A and 25B are each a diagram for explaining the cam shapes of the present embodiment. In the present embodiment, cams are configured to come into contact at two points. In the case of the configuration in which a cam shape is provided in the turning member 25 at one position, when the turning member 25 receives side pressure from the sliding member 26, a force to tilt the turning member 25 about the center of rotation as a fulcrum is generated. When the rod member 22 integrated with the turning member 25 is operated in this state, the pressing force is concentrated on one point, generating abnormal noise in some cases. In the ninth embodiment, a two point-contact configuration in which another cam shape is arranged at a position circumferentially shifted by 180°, and is also provided on a circumference having a different diameter is achieved. Since this makes it possible to suppress the force to tilt about the center of rotation as the fulcrum, the generation of the abnormal noise can be suppressed. Note that the reason why the cam shapes are provided on circumferences having different diameters is that the rod member 22 is configured to be rotatable by 180° or more, in order to deal with breakage due to static pressure which can be generated by the operation of the user as described above. Specifically, if the cam shapes are provided on the circumference having the same diameter, the concave shape of the sliding member 26 overlaps. For this reason, the cam shapes are provided on circumferences having different diameters, respectively, as shown in FIGS. 25A and 25B.

Note that although in the present embodiment, the shape in which the number of cam shapes is increased to two to deal with abnormal noise has been described, the cam shape may be further added on a circumference having a different diameter Since the phenomenon of tilting about the center of rotation as the fulcrum can be suppressed better when the number of cam shapes is increased to three, the effect against abnormal noise is increased.

As described above, the present embodiment makes it possible to suppress generation of abnormal noise in the case where the user operates the rod member 22.

Other Embodiments

Although in the above-described embodiments, the examples of the sheet member in which the receiving member for receiving the printing medium is formed of a cloth has been described, the present disclosure is not limited to this. Any material may be used as long as the member can be attached to the rod member 22 and the printer 10, and takes on a substantially U shape due to its weight in use as viewed from the side face.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-017855, filed Feb. 8, 2022, which is hereby incorporated by reference herein in its entirety.

What is claimed is:

1. A printing medium accommodating apparatus in which to stack a printing medium discharged from a discharge port of a printing apparatus, comprising:

a receiving member configured to receive a printing medium discharged from the discharge port;

a holding member configured to hold one end of the receiving member; and an attachment unit including a turning member configured to turn the holding member, the attachment unit being capable of being attached to an insertion slot provided in the printing apparatus, wherein the holding member is configured to be turnable about a rotation shaft of the turning member, and is configured to hold the one end of the receiving member at a desired position in a state in which the attachment unit is attached to the insertion slot.

2. The printing medium accommodating apparatus according to claim 1, wherein the attachment unit includes:

a sliding member configured to slide along the turning member; and an elastic member configured to press the sliding member against the turning member.

3. The printing medium accommodating apparatus according to claim 2, wherein the turning member has a first cam shape on a side face in a direction of the rotation shaft, the sliding member has a second cam shape corresponding to the first cam shape, and the second cam shape is formed at a plurality of positions corresponding to a turn phase.

4. The printing medium accommodating apparatus according to claim 3, wherein the plurality of positions include a discharge position used in a case in which the printing medium accommodating apparatus is used, and a storage position used in a case in which the printing medium accommodating apparatus is not used.

5. The printing medium accommodating apparatus according to claim 4, wherein the plurality of positions further include a static load avoiding position at which the holding member is capable of coming into contact with the printing apparatus placed on a ground face.

6. The printing medium accommodating apparatus according to claim 5, wherein at the static load avoiding position, the turning member is receiving a force in a direction to turn from the static load avoiding position to the discharge position.

7. The printing medium accommodating apparatus according to claim 1, wherein the holding member is configured to hold the one end of the receiving member at a predetermined position.

8. The printing medium accommodating apparatus according to claim 1, wherein the attachment unit includes an insertion member configured to be inserted into the insertion slot, a plate spring is formed in the insertion member, and the plate spring is configured to be bent in a case in which the insertion member is inserted into the insertion slot.

9. The printing medium accommodating apparatus according to claim 1, wherein the attachment unit includes an insertion member configured to be inserted into the insertion slot, the insertion member includes:

a lever member having a hook portion and a button portion integrated with each other; and a spring member configured to press the lever member in a direction in which the hook portion is exposed from the insertion member, and the insertion slot has an engagement portion configured to engage with the hook portion.

10. The printing medium accommodating apparatus according to claim 1, further comprising:

an elastic member on a lower face of the first attachment unit.

11. The printing medium accommodating apparatus according to claim 1, further comprising:

a second attachment unit configured to be capable of attaching an opposite end of the receiving member on an opposite side to the one end to the printing apparatus, wherein the receiving member takes on a substantially U shape in a state in which the attachment unit and the second attachment unit are attached to the printing apparatus.

12. The printing medium accommodating apparatus according to claim 11, wherein a depressed portion is formed below the discharge port of the printing apparatus, and the second attachment unit is configured to be attachable to the depressed portion.

13. The printing medium accommodating apparatus according to claim 11, wherein an opening is formed below the discharge port, and the second attachment unit is configured to be attachable to the opening.

14. The printing medium accommodating apparatus according to claim 11, wherein the receiving member has a bag shape extending across a width of the receiving member at the opposite end, and the second attachment unit is formed in a member configured to be contained in the bag shape.

15. The printing medium accommodating apparatus according to claim 11, wherein the opposite end of the receiving member is arranged above a ground face of the printing apparatus.

16. A printing apparatus to which a printing medium accommodating apparatus can be attached, the printing medium accommodating apparatus including:

a receiving member configured to receive a printing medium discharged from a discharge port of the printing apparatus;

a holding member configured to hold one end of the receiving member; and an attachment unit including a turning member configured to turn the holding member, the attachment unit being capable of being attached to the printing apparatus, the printing apparatus comprising:

the discharge port; and an insertion slot configured such that the attachment unit is attached to the insertion slot, wherein the holding member is configured to be turnable about a rotation shaft of the turning member, and is configured to hold the one end of the receiving member at a desired position in a state in which the attachment unit is attached to the printing apparatus.

* * * * *